(12) United States Patent
Johnston

(10) Patent No.: US 6,373,946 B1
(45) Date of Patent: Apr. 16, 2002

(54) COMMUNICATION SECURITY

(75) Inventor: Thomas Francis Johnston, London (GB)

(73) Assignee: ICO Services Ltd., London (GB)

(*) Notice: Subject to any disclaimer, the term of this patent is extended or adjusted under 35 U.S.C. 154(b) by 0 days.

(21) Appl. No.: 08/997,695

(22) Filed: Dec. 23, 1997

Related U.S. Application Data

(63) Continuation-in-part of application No. 08/866,912, filed on May 30, 1997.

(30) Foreign Application Priority Data

May 31, 1996 (GB) ............................................... 9611411
Dec. 23, 1996 (EP) ............................................. 96309444

(51) Int. Cl.$^7$ ............................................. H04N 7/167
(52) U.S. Cl. ............................................................. 380/211
(58) Field of Search ......................... 380/21, 277, 278, 380/279–283, 247, 273

(56) References Cited

U.S. PATENT DOCUMENTS

| | | | | |
|---|---|---|---|---|
| 4,182,933 A | * | 1/1980 | Rosenblum | 380/21 |
| 4,649,233 A | * | 3/1987 | Bass et al. | 380/21 |
| 4,794,644 A | * | 12/1988 | Philip et al. | 380/21 |
| 5,185,796 A | | 2/1993 | Wilson | |
| 5,301,247 A | | 4/1994 | Rasmussen et al. | |
| 5,357,571 A | * | 10/1994 | Banwart | 380/21 |
| 5,375,169 A | | 12/1994 | Seheidt et al. | |

FOREIGN PATENT DOCUMENTS

| | | |
|---|---|---|
| EP | 0 257 585 | 3/1988 |
| EP | 0 365 885 | 5/1990 |
| EP | 0 393 806 | 10/1990 |
| EP | 0 688 140 | 12/1995 |
| FR | 2 608 338 | 6/1988 |
| GB | 2 278 518 | 11/1995 |
| WO | WO 95/30976 | 11/1995 |

OTHER PUBLICATIONS

Campanini, G. et al., "Privacy, Security and User Identification . . . ", Proceedings of the International Conference on Digital Land Mobile Radio Communications, Jun. 30, 1987, pp. 152–164.

Diffie, Whitfield et al., "Multiuser Cryptographic Techniques", AFIPS Conference Proceedings of National Computer Conference, vol. 45, June 1976, pp. 109–112.

Presttun, K., "Security Measures in Communication Networks", Electrical Communication, vol. 60, No. 1, 1986, pp. 63–70.

Van der Arend, Peter C.J., "Security Aspects and the Implementation in the GSM–System", Proceedings of Digital Cellular Radio Conference, Oct. 12, 1988, pp. 4a/1–4a/7.

* cited by examiner

Primary Examiner—Gilberto Barron, Jr.
(74) Attorney, Agent, or Firm—Nixon & Vanderhye P.C.

(57) ABSTRACT

A satellite mobile telecommunications system includes mobile terminals 2a, 2b which can communicate with one another using end-to end encryption and decryption techniques. When secure end-to-end communication is required, each terminal uses a common encryption code (RAND) to encode data and decode data transmitted between the terminals. The encryption code is transmitted in a secure manner from a remote database station (15) to the terminals. Each terminal stores a terminal key ($K_a$, $K_b$) on its SIM card and the keys are also held in the remote station (15). Partial keys ($K_{pa}$, $K_b$) comprising the pseudo random number (RAND) and the keys $K_a$, $K_b$ stored at the station (15) are produced at the station (15) by an exclusive OR process in order to mask the keys and the random number. The partial key $K_{pa}=K_a+$(RAND) is sent to terminal 2a. At the terminal 2a, the partial key $K_{pa}$ is exclusive OR-ed with the locally stored terminal key $K_a$ on the SIM card, so as to recover (RAND). The common code (RAND) is determined by the same process at terminal 2b, from $K_{pb}=K_b+$(RAND) and the locally stored key $K_b$. The terminals then both run a GSM encryption algorithm (A5) to encrypt and decrypt transmitted data, on the basis of the common code (RAND).

6 Claims, 14 Drawing Sheets

| ID # | KEY Ki | STATUS | POSITION | ACTIV NODE | AVAIL ? | HOME |
|------|--------|--------|----------|------------|---------|------|
| 00001 | $K_A$ | LOCAL | 46°, 35° | 6a | Y | 8a |
| 00002 | $K_B$ | GLOBAL | 71°, 27° | 6b | Y | 8b |
| | | | | | | |
| | | | | | | |
FIG. 6
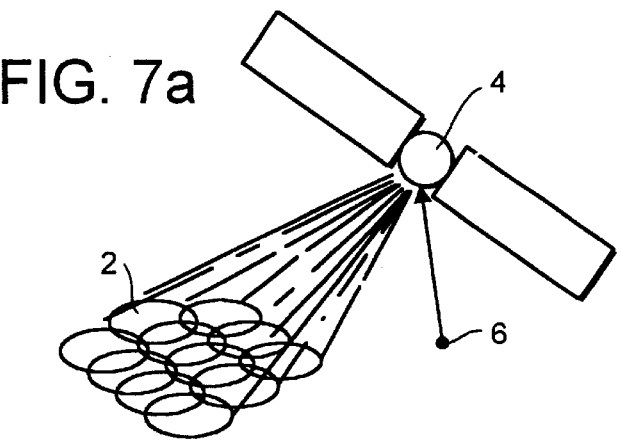
FIG. 7a
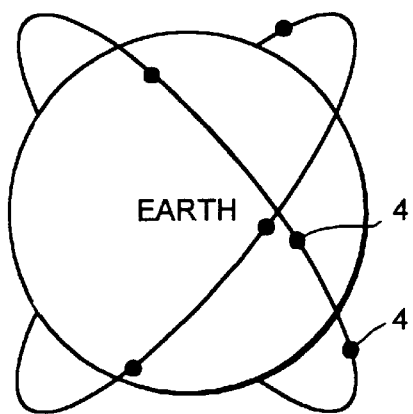
FIG. 7b

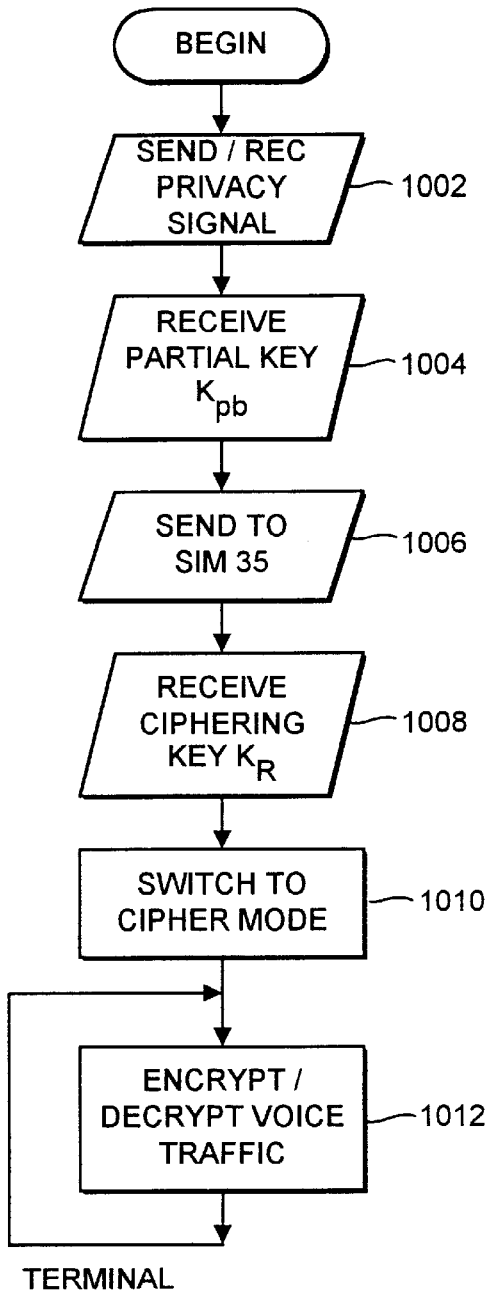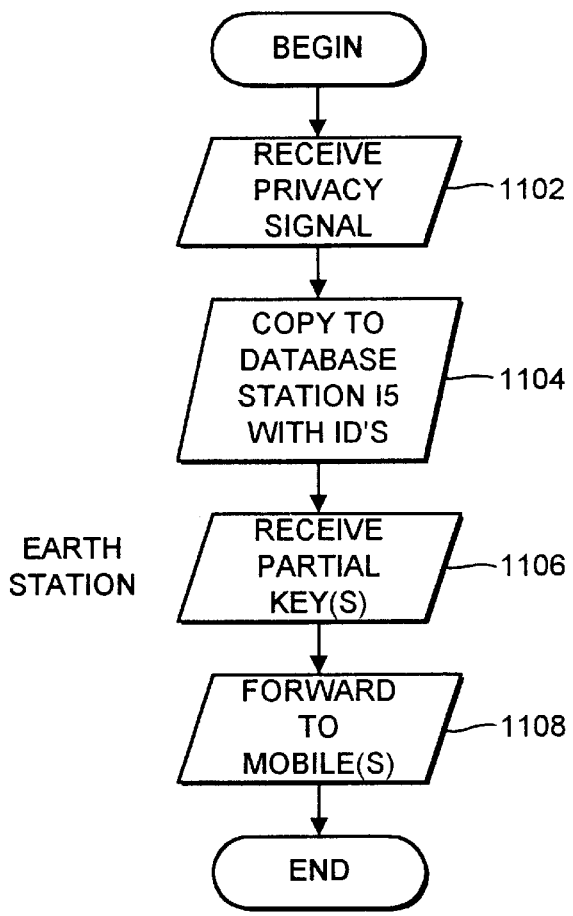
FIG. 10
FIG. 11

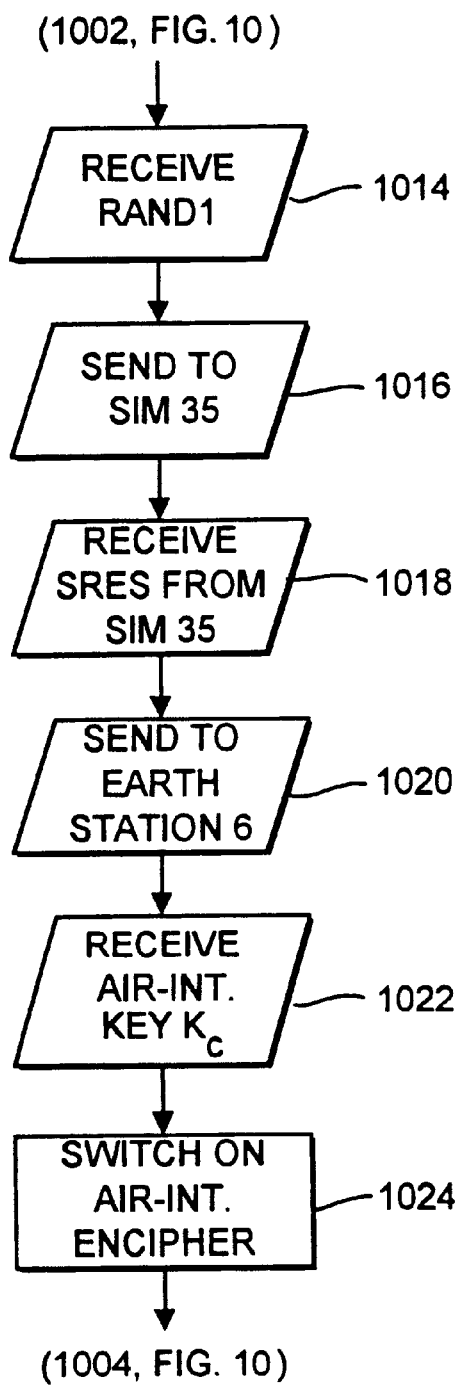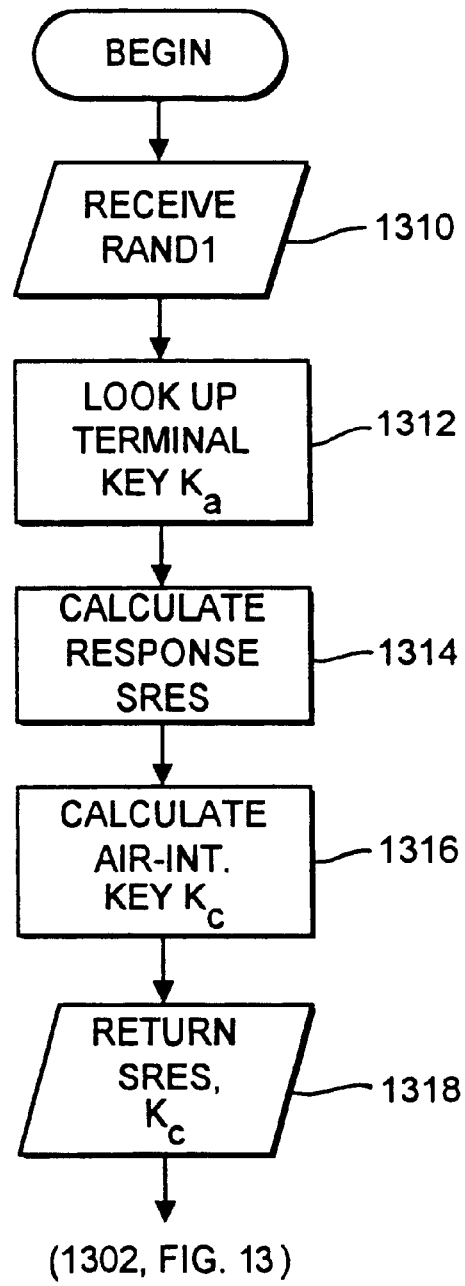
FIG. 20
FIG. 23

COMMUNICATION SECURITY

This application is a continuation-in-part of application Ser. No. 08/866,912, filed May 30, 1997.

FIELD OF THE INVENTION

This invention relates to a method and apparatus for providing secure communication through a communications network.

BACKGROUND

Digital mobile voice communications systems are well known and one example is the GSM terrestrial cellular system. Others are the Inmarsat-M satellite telephone system, the IRIDIUM™ satellite cellular system described in, for example, EP-A-0365885, the ICO™ satellite cellular system described in, for example, GB-A-2295296 or the ODYSSEY™ satellite cellular system described in, for example EP-A-0510789. Since such systems operate over a wireless link, there is a risk of interception of calls by unauthorised persons.

The GSM system includes an optional encryption scheme described in, for example, "Security aspects and the implementation in the GSM-system"; Peter C. J. van der Arend, paper 4a, Conference Proceedings of the Digital Cellular Radio Conference (DCRC), Oct. 12th–14th, 1988, published by Deutsche Bundespost, France Telecom and Fernuniversitate. Greater detail is given in the following GSM recommendations: GSM 02.09 "Security Aspects"; GSM03.20 "Security Related Algorithms". In this scheme, a database known as the Authentication Centre (AuC) holds an individual encryption key number ($K_i$) for each subscriber to the authentication service, which is also stored on a chip known as the Subscriber Information Module (SIM) held in the subscriber's mobile terminal. The subscriber has no access to the data stored in the SIM and cannot read the key.

Where a secure session is requested, a random number (RAND) is generated by the AuC and used, together with the customer's key ($K_i$), to calculate a ciphering key ($K_c$) used during the session for ciphering and deciphering messages to/from the subscriber. The random number is sent from the AuC to the subscriber's mobile terminal via the Base Transceiver Station (BTS). The mobile terminal passes the random number to the SIM, which calculates the ciphering key $K_C$ using an algorithm termed A5, from the received random number and the stored key ($K_i$). Thus, the random number is sent over the air, but not the customer's key $K_i$ or the ciphering key $K_c$.

The random number and the ciphering key $K_c$ are fed to the Home Location Register (HLR) database of the GSM network, which stores details for the subscriber concerned, and are also sent to the Visiting Location Register (VLR) for the area where the user terminal is currently located, and are supplied to the BTS via which the mobile is communicating to the network.

The ciphering key $K_c$ is used, together with the current TDMA frame number,to implement the A5 ciphering algorithm in both the mobile terminal and the BTS so that data transmitted over the air interface between the mobile terminal and the BTS is encrypted. Thus, the individual user key $K_i$ is stored only at the authentication centre and the SIM, where the ciphering key $K_c$ is calculated and forwarded to the BTS and the mobile terminal.

Whilst this scheme is adequate in many respects, it fails to provide complete security since it offers protection only over the air transmission path. Thus, it is possible for illicit access to be obtained by tampering with the fixed part of the network.

Accordingly, end-to-end encryption schemes have been proposed. Because the encryption runs from one user terminal to the other, across the whole communications path and not just the air path, improved privacy is obtained.

The basic problem in offering end-to-end encipherment of communications over a network is in providing each of the two users with the same, or each other's, secret key. In some applications, a group of terminals (for example all owned by a single body) may all have access to the same key. Whilst this provides privacy against personnel from outside the group, it is an incomplete solution since it does not provide privacy for communication between two terminals within the group and a third within the group.

It is possible to employ public key encryption systems, in which each terminal has a secret decryption key and a non-secret encryption key, so that any other party can use the encryption key to encrypt data but only the recipient can decrypt data which has been encrypted using the public encryption key.

A communication system could be envisaged in which every user is provided with such a pair of keys, and in setting up a communication between a pair of users each sends the other its encryption key whilst keeping its decryption key secret. However, there is widespread public concern that the use of such techniques on a telecommunications network would allow criminals or terrorists to communicate using completely secure communications, free from any possibility of supervision.

It has been proposed to hold the keys in a remote "trusted third party" database. An example of such an arrangement is described in "Security measures in communication networks", K. Presttun, Electrical Communication, 1986, Vol 60, No. 1 pp 63–70. The keys for two users (user A and user B) are distributed from a remote key distribution centre as a common, masked message, which is firstly sent to user A, where the key for user A is stripped out, and then from user A to user B, to provide the key to user B.

In our GB 96 11411.1 (and corresponding U.S. Ser. No. 08/866 912) there is described an end-to-end encryption and decryption scheme in which the terminal keys that are stored in the terminals, are held additionally in a remote "trusted third party" database. In order to set up an encrypted transmission between a first and a second terminal, each of them is provided from the remote location with a partial key which contains masked data concerning the key of the other terminal, derived from the stored data in the database. As a result, both terminals can be provided with data that in combination with their own key stored at the terminal, enables them each to set up a common secret code which can be used for end to end encryption and decryption through the network.

A difficulty with the prior references "trust third party" databases arises when it is desired to set up secure conference calls between three or more terminals. Each terminal needs to be provided with masked data concerning all the keys of the other terminals participating in the conference call so that they can each establish a common code, with the result that the partial keys and the final encryption code become long and cumbersome in dependence upon the number of participants. Also the risk of the code being ascertained by eavesdropping, from the long partial keys, is increased.

SUMMARY OF THE INVENTION

The present invention provides a solution to these problems. The invention provides a method of distributing through a communications network, enciphering key data to be used in encrypting and decrypting data at first and second terminals so as to provide secure data transmission between the terminals through the network, the terminals each storing corresponding first and second terminal keys, the method comprising: storing the first and second keys remotely of the terminals; generating at a location remote from both of the terminals, first and second separate partial keys each as a masked function of a common number and a corresponding one of said separately stored keys; dispatching the first partial key separately towards the first terminal; and separately dispatching the second partial key separately towards the second terminal.

The invention also provides a method of setting up a first terminal that stores an individual terminal key, to encrypt data to be transmitted according to a secure encryption code through a communications network to a second terminal where the data is to be decrypted, comprising receiving at the first terminal a partial key dispatched thereto through the network from a remote location, the partial key being a masked function of the individual terminal key and a number for determining the encryption code, and comparing at the terminal the received partial key and the stored key so as to provide the encryption code.

The invention also extends to a method of setting up a second terminal that stores an individual terminal key, to decrypt data transmitted thereto according to a secure encryption code through a communications network from a first terminal where the data is encrypted, comprising receiving at the second terminal a partial key dispatched thereto through the network from a remote location, the partial key being a masked function of the individual terminal key and a number for determining the code, and comparing at the second terminal the received partial key and the stored key so as to provide data for decrypting the code.

Thus in accordance with the invention, each terminal is provided with a partial key from the remote location that includes masked data concerning the terminal key of the terminal itself, without the need for key of the other terminal, so that the protocol can readily be expanded from communications between two terminals, to large numbers of terminals in conference calls without lengthening the partial keys.

One or more additional terminals may join in a call whilst it is in progress, either to expand a normal two party call into a three party conference call or to increase the number of parties in a conference call. To this end, the joining party is sent a masked version of its key so that it can determine the code, together with the frame number for the data transmission that is going on between the parties, so that the joining party can join in the transmitted data flow.

The invention is envisaged for use in satellite mobile digital communications systems, and is also useful in corresponding terrestrial digital mobile communication systems (e.g. in cellular systems such as the GSM system), or in fixed link communication systems. The invention may also be practised in store-and-forward communication systems such as e-mail or the Internet.

BRIEF DESCRIPTION OF THE DRAWINGS

Embodiments of the invention will now be described, by way of example only, with reference to the accompanying drawings, in which:

FIG. 6 illustrates the contents of a store forming part of the database station of FIG. 5;

FIG. 7a illustrates schematically the beams produced by a satellite in the embodiment of FIG. 1;

FIG. 7b illustrates schematically the disposition of satellites forming part of FIG. 1 in orbits around the earth;

FIG. 10 is a flow diagram showing schematically the process performed by the control and enciphering components of the handset of FIG. 8 in the first embodiment;

FIG. 11 is a flow diagram showing schematically the process of operation of the earth station of FIG. 3 in the first embodiment.

FIG. 20 (incorporating parts of FIG. 10) is a flow diagram showing schematically the operation of a handset according to the fourth embodiment;

FIG. 23 (incorporating parts of FIG. 13) is a flow diagram showing schematically the operation of a subscriber information module according to the fourth embodiment.

DETAILED DESCRIPTION

Figure 1:
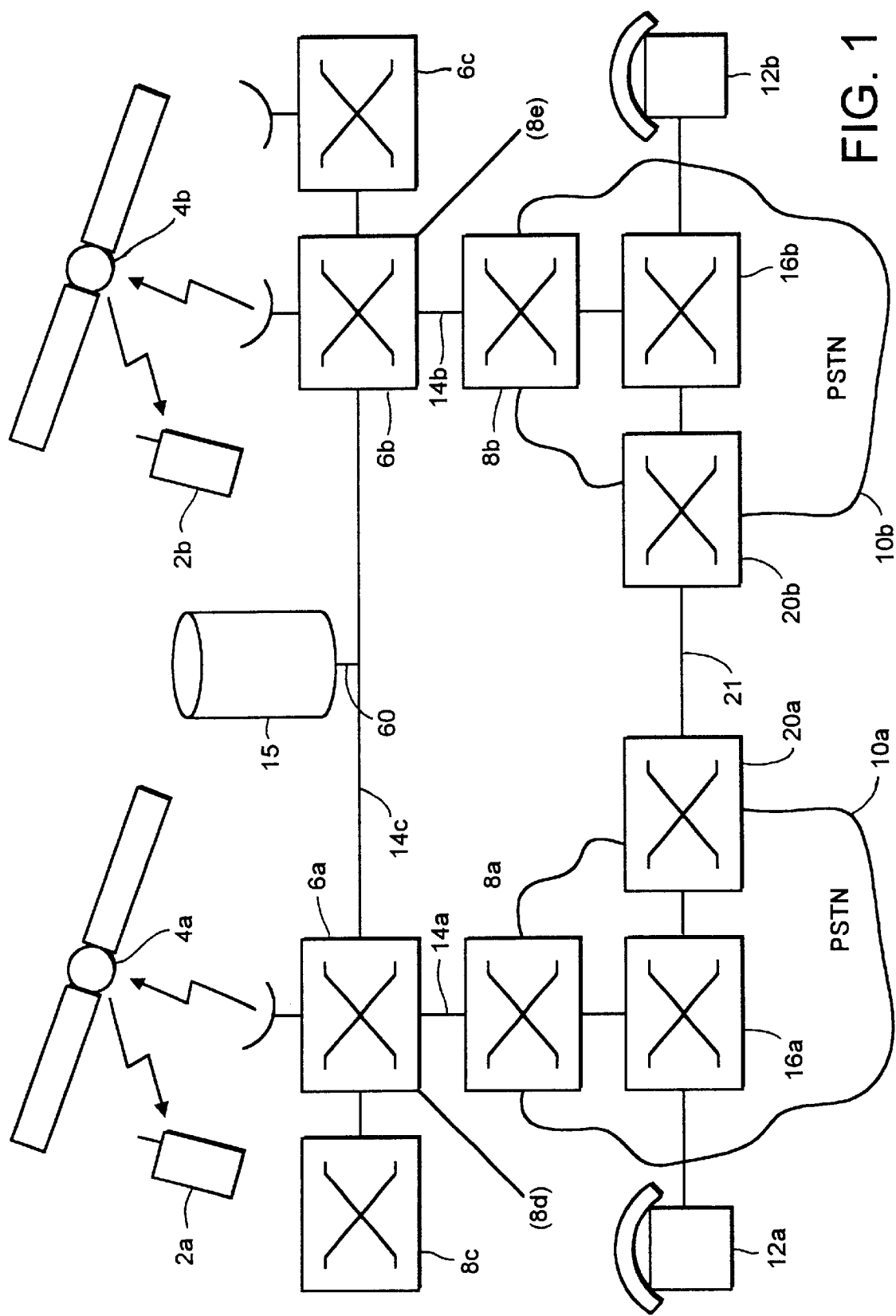
FIG. 1 is a block diagram showing schematically the elements of a communication system embodying the present invention.

Referring to FIG. 1, a satellite communications network according to this embodiment comprises mobile user terminal equipment 2a, 2b; orbiting relay satellites 4a, 4b; satellite earth station nodes 6a, 6b, 6c; satellite system gateway stations 8a, 8b; public switched telecommunications networks 10a,10b; and fixed telecommunications terminal equipment 12a,12b.

Interconnecting the satellite system gateways 8a, 8b, 8c with the earth station nodes 6a, 6b, 6c and interconnecting the nodes 6a, 6b, 6c with each other, is a dedicated ground-based network comprising channels 14a,14b,14c. The satellites 4, earth station nodes 6 and lines 14 make up the infrastructure of the satellite communications network, for communication with the mobile terminals 2, and accessible through the gateway stations 8.

A terminal location database station 15 is connected, via a signalling link 60 (e.g. within the channels 14 of the dedicated network) to the gateway station and earth stations 6.

The PSTNs 10a, 10b comprise, typically, local exchanges 16a, 16b to which the fixed terminal equipment 12a, 12b is connected via local loops 18a, 18b; and international switching centres 20a, 20b connectable one to another via transnational links 21 (for example, satellite links or subsea optical fibre cable links). The PSTNs 10a, 10b and fixed terminal equipment 12a, 12b (e.g telephone instruments) are well known and almost universally available today.

Each mobile terminal apparatus is in communication with a satellite 4 via a full duplex channel (in this embodiment) comprising a down link channel and an up link channel, for example (in each case) a TDMA time slot on a particular frequency allocated on initiation of a call, as disclosed in patent applications GB 2288913 and GB 2293725. The satellites 4 in this embodiment are non geostationary and thus, periodically, there is hand over from one satellite 4 to another.

Mobile Terminal 2

Figure 2:
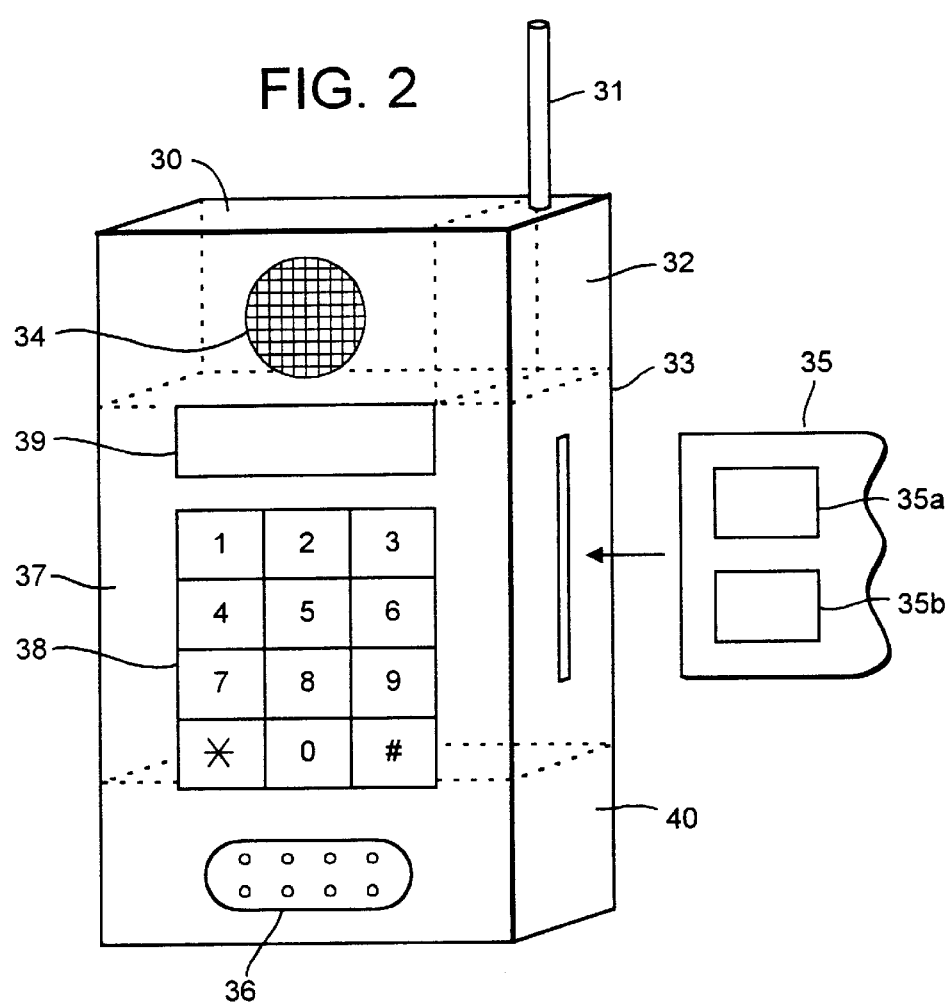
FIG. 2 is a block diagram showing schematically the elements of mobile terminal equipment suitable for use with the present invention.

Referring to FIG. 2, the mobile terminal equipment of FIG. 1 is shown. One suitable form is a handset, as shown. Details of the handsets 2a,2b etc will not be described and are similar to those presently available for use with the GSM system, comprising a digital coder/decoder 30, together with conventional microphone 36, loudspeaker 34, battery 40, keypad components 38, a radio frequency (RE) interface 32 and antenna 31 suitable for satellite communications. Preferably a display 39, for example a liquid crystal display, is also provided. A 'smart card' reader 33 receiving a smart card (SIM) 35 storing user information is also provided.

The coder/decoder (codec) 30 comprises a low bit rate coder, generating a speech bit stream at around 3.6 kilobits per second, together with a channel coder applying error correcting encoding, to generate an encoded bit stream at a rate of 4.8 kilobits per second. The low bit rate coder may, for example, be a linear predictive coder such as a multiple pulse predictive coder (MPLPC), a code book excited linear predictive coder (CELP), or a residual excited linear predictive coder (RELP). Alternatively, it may employ some form of waveform coding such as subband coding.

The error protection encoding applied may employ block codes, BCH codes, Reed-Solomon codes, turbo codes or convolutional codes. The codec 30 likewise comprises a corresponding channel decoder (e.g. using Viterbi or soft decision coding) and speech decoder.

Also provided is a control circuit 37 which may in practice be integrated with the coder 30, consisting of a suitably programmed microprocessor, microcontroller or digital signal processor (DSP) chip.

The SIM 35 preferably complies with GSM Recommendations 02.17 "Subscriber Identity Modules", and 11.11 and is preferably implemented as an industry standard "Smart Card". The SIM 35 and reader 33 are therefore preferably as described in International Standards ISO 7810, 7811 and 7816; these and GSM 02.17 and 11.11 are all incorporated herein by reference.

Specifically, the SIM 35 includes a processor 35a and permanent memory 35b. The processor 35a is arranged to perform some encryption functions as described in greater detail below.

Earth Station Node 6

The earth station nodes 6 are arranged for communication with the satellites.

Figure 3:
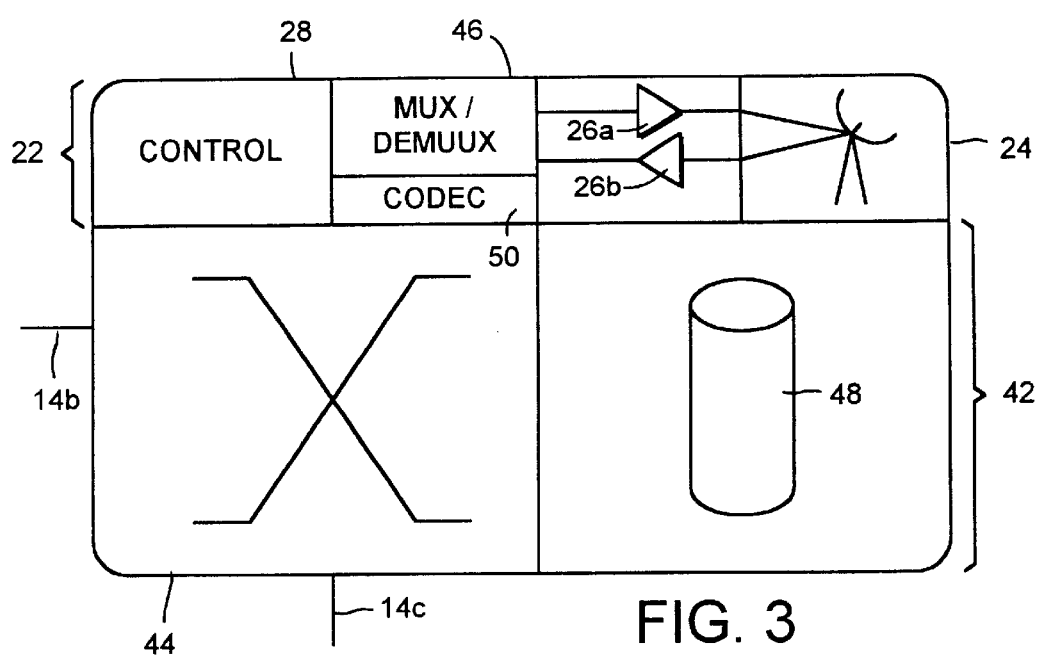
FIG. 3 is a block diagram showing schematically the elements of an Earth station node forming part of the embodiment of FIG. 1.

Each earth station node 6 comprises, as shown in FIG. 3, a conventional satellite earth station 22 consisting of at least one satellite tracking antenna 24 arranged to track at least one moving satellite 4; RF power amplifiers 26a for supplying a signal to the antenna 24, and 26b for receiving a signal from the antenna 24; and a control unit 28 for storing the satellite ephemeris data, controlling the steering of the antenna 24, and effecting any control of the satellite 4 that may be required (by signalling via the antenna 24 to the satellite 4).

The earth station node 6 further comprises a mobile satellite switching centre 42 comprising a network switch 44 connected to the trunk links 14 forming part of the dedicated network. A multiplexer 46 is arranged to receive switched calls from the switch 44 and multiplex them into a composite signal for supply to the amplifier 26 via a low bit-rate voice codec 50. The earth station node 6 also includes a local store 48 storing details of each mobile terminal equipment 2a within the area served by the satellite 4 with which the node 6 is in communication.

Gateway 8

Figure 4:
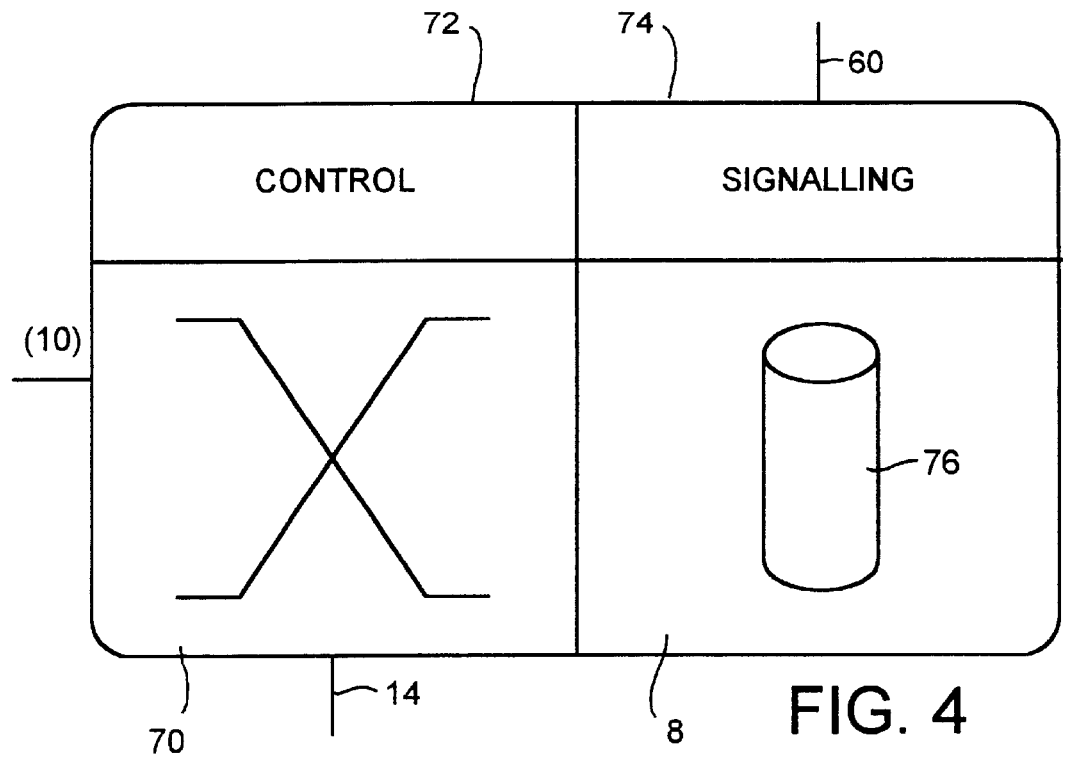
FIG. 4 is a block diagram showing schematically the elements of a gateway station forming part of the embodiment of FIG. 1.

Referring to FIG. 4, the gateway stations 8a,8b comprise, in this embodiment, commercially available mobile switching centres (MSCs) of the type used in digital mobile cellular radio systems such as GSM systems. They could alternatively comprise a part of an international or other exchange forming one of the PSTNs 10a, 10b operating under software control to interconnect the networks 10 with the satellite system trunk lines 14.

The gateway stations 8 comprise a switch 70 arranged to interconnect incoming PSTN lines from the PSTN 10 with dedicated service lines 14 connected to one or more Earth station nodes 6, under control of a control unit 72. The control unit 72 is capable of communicating with the data channel 60 connected to the database station 15 via a signalling unit 74, and is arranged to generate data messages in some suitable format (e.g. as packets or ATM cells).

Also provided in the gateway stations 8 is a store 76 storing billing, service and other information relating to those mobile terminals 2 for which the gateway station 8 is the home gateway station. Data is written to the store 76 by the control unit 72 after being received via the signalling unit 74 or switch 70, from the PSTN 10 or the Earth station nodes 6 making up the satellite network. This store acts in the manner of a visitor location register (VLR) of a terrestrial GSM network, and a commercially available VLR may therefore be used as the store 76.

The satellite system trunk lines 14 comprise, in this embodiment, high quality leased lines meeting acceptable minimum criteria for signal degradation and delay. In this embodiment, all the lines 14 comprise terrestrial links. The trunk lines 14 are preferably dedicated lines, so that the lines 14 form a separate set of physical channels to the networks 10. However, the use of virtual circuits through the networks 10 is not excluded.

Database Station 15

Figure 5:
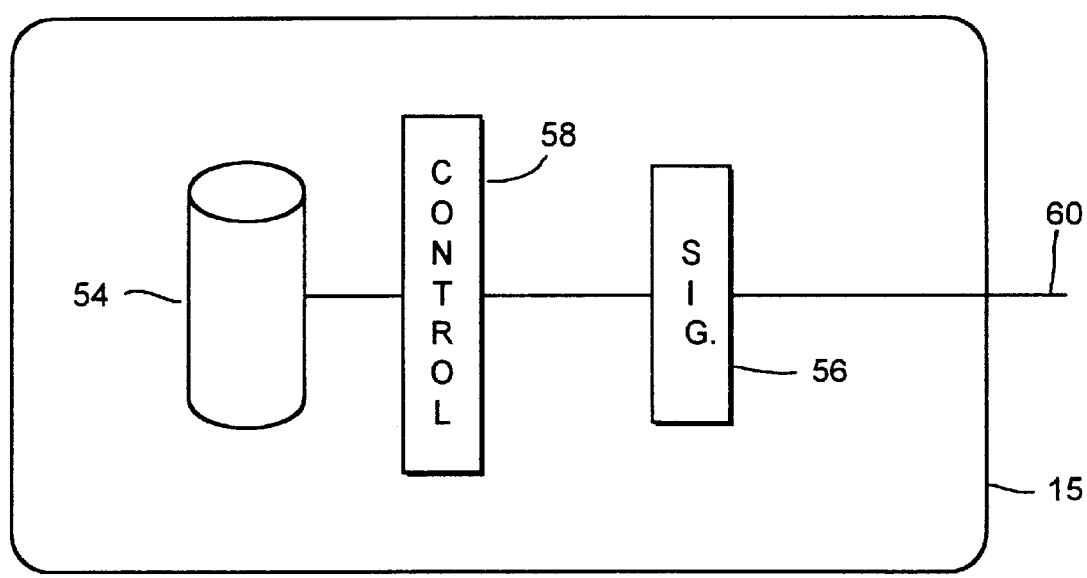
FIG. 5 is a block diagram showing schematically the elements of a database station forming part of the embodiment of FIG. 1.

Referring to FIG. 5, the database station 15 comprises a digital data store 54, a signalling circuit 56, a processor 58 interconnected with the signalling circuit 56 and the store 54, and a signalling link 60 interconnecting the database station 15 with the gateway stations 8 and Earth stations 6 making up satellite system network, for signalling or data message communications.

The store 54 contains, for every subscriber terminal apparatus 2, a record showing the identity e.g. the International Mobile Subscriber Identity or IMSI; the current status of the terminal 2 (whether it is "local" or "global" as will be disclosed in greater detail below); the geographical position of the mobile terminal 2 (either in co-ordinate geometry, or as code identifying an area within which it lies); the "home" gateway station 8 with which the apparatus is registered (to enable billing and other data to be collected at a single point) and the currently active Earth station node 6 with which the apparatus 2 is in communication via the satellite 4. The contents of the store are indicated in FIG. 6.

Further, in this embodiment the store contains for each user a unique and individual enciphering key Ki, to be used as described below.

The signalling circuit 56 and processor 58 are arranged to receive interrogating data messages, via the signalling link 60 which may be a packet switched connection, from gateways 8 or nodes 6, comprising data identifying one of the mobile terminals 2, for example, the telephone number of the equipment 2, and the processor 58 is arranged to search the store 54 for the status and active earth station node 6 of the terminal 2, and to transmit these in a reply message via the data line 60.

Thus, in this embodiment the database station 15 acts to fulfil the functions both of a home location register (HLR) of a GSM system, and of an authentication centre (AuC) of a GSM system, and may be based on commercially available GSM products.

Satellites 4

The satellites 4a, 4b comprise generally conventional communications satellites, such as the known Hughes HS 601 model, and may include features as disclosed in GB 2288913. Each satellite 4 is arranged to generate an array of beams covering a footprint beneath the satellite, each beam including a number of different frequency channels and time slots, as described in GB 2293725 and illustrated in FIG. 7a.

The satellites 4 are arranged in a constellation in sufficient numbers and suitable orbits to cover a substantial area of the globe, preferably to give full, continuous global coverage. For example 10 or more satellites may be provided in two mutually orthogonal intermediate circular orbits at an altitude of, for example, 10,500 kilometres as shown in FIG. 7b. However, larger numbers of lower satellites may be used, as disclosed in EP 0365885, or other publications relating to the Iridium system, for example.

Registration and Location

In one embodiment, a customer mobile terminal apparatus 2 may be registered with one of two distinct statuses; "local" in which the mobile terminal apparatus is permitted only to communicate through one local area, or part of the satellite system network, and "global", which entitles the apparatus to communicate through any part of the satellite system network.

The status of each apparatus 2, i.e. "local" or "global", is stored in the record held for the apparatus 2 concerned in the store 54 of the database station 15, as shown in FIG. 6.

The mobile terminal apparatus 2 performs an automatic registration process, of the kind well known in the art of cellular terrestrial communications, on each occasion when the terminal 2 is utilised for an outgoing call; and/or when the apparatus 2 is switched on; and/or periodically whilst the apparatus 2 is switched on. As is conventional, the registration process takes the form of the broadcasting of a signal identifying the mobile terminal 2 (e.g. by transmitting its telephone number on a common hailing or signalling frequency).

The transmitted signal is picked up by one or more of the satellites 4. Under normal circumstances, the signal is picked up by multiple satellites 4, and the received signal strength and/or time of arrival are transmitted, together with the identity of the mobile apparatus 2 and the identity of the satellite 4 receiving the signal, to the database station 15 via the earth station node or is nodes 6 for which the satellites 4 are in communication, and the signalling line 60.

The processor 58 of the database station 15 then calculates, e.g. on the basis of the differential arrival times, the terrestrial position of the mobile terminal apparatus 2, which is stored in the database 54. Also stored is the identity of the earth station node 6 most suitable for communicating with the mobile terminal apparatus 2 (the "active" station). This is typically found by the processor 58 comparing the stored position of the terminal 2 with the predetermined stored positions of each of the earth station nodes 6 and selecting the nearest. However, account may also or instead be taken of the strength of the signals received via the satellites 4, or of other factors such as network congestion, which may result, in borderline cases, in the choice of a node earth station which is not geographically closest to the mobile terminal equipment 2. The identity of the allocated active earth station node 6 is then likewise stored in the store 54 in the record for that terminal apparatus.

Call Set Up and Routing

The processes of routing calls to and from mobile terminal apparatus 2 are described fully in GB-A-2295296 and PCT/GB95/01087, both of which are hereby incorporated fully by reference. Briefly, for a local user outside its area, a call placed to the user or from the user is referred to the database station which determines that the user is outside of its area and thereafter does not process the call.

For a local user which is inside its area, in the preferred embodiment described in the above referenced British and International application, calls to or from the mobile user and a conventional terrestrial user connected to one of the PSTNs are set up over the satellite link, via the active earth station 6, the ground network, and the international public switch telephone network (PSTN) from the nearest gateway 8 to the terrestrial user.

For global users, calls are routed via the satellite and the active earth station, then via the ground network to the gateway station 8 nearest to the terrestrial user.

The dial numbers allocated to mobile users may have "International" prefixes followed by a code corresponding to the satellite service network. Alternatively, they could have a national prefix followed by a regional code assigned to the satellite service.

Calls between one mobile user and another are carried out by directing the signal via a first satellite link down to the active earth station node of the first mobile user, via the ground network to the active earth station node of the second mobile user (which may be, but is not necessarily, the same as that of the first) and then via a second satellite link (which may, but does not need to be via the same satellite) to the second mobile user.

First Embodiment

Figure 8:
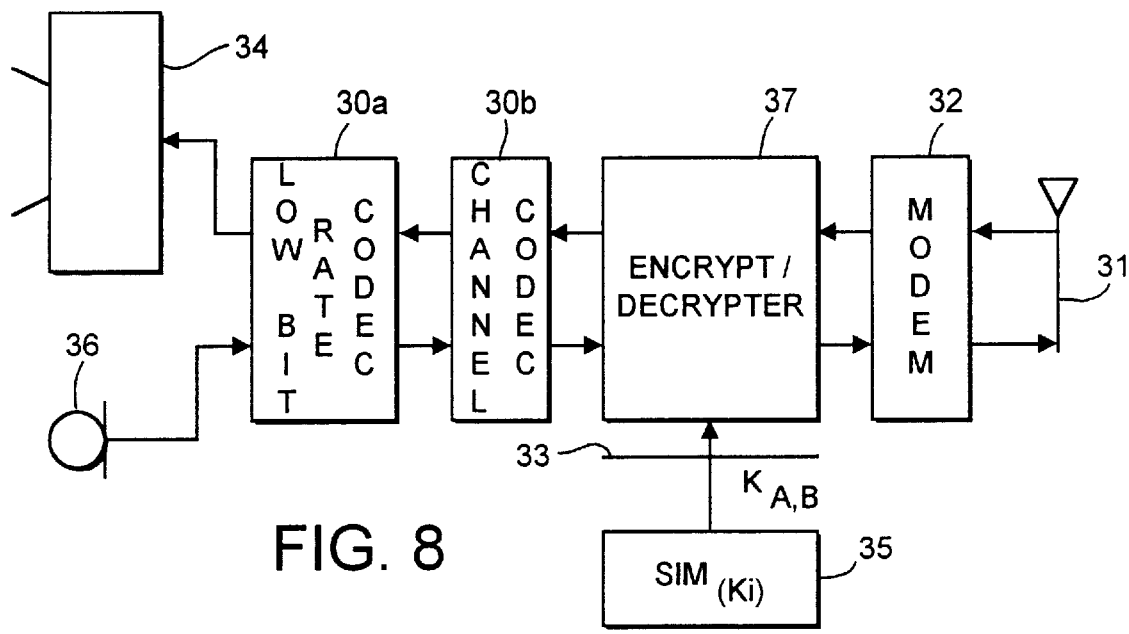
FIG. 8 is a block diagram showing the signal flow between components of the handset of FIG. 2 in a first embodiment of the invention.

FIG. 8 shows in greater detail the signal flow through the elements of the mobile terminal of FIG. 2. Signals received from the aerial 31 are RF demodulated by RF modem 32 and supplied to the processor circuit 37 which is arranged, when in deciphering mode, to decipher the received data using, for example, the A5 algorithm in accordance with a deciphering key supplied from the SIM 35. The deciphering key is referred to as $K_{a,b}$.

The deciphered bit stream is then passed to a channel codec 30b which performs error correcting decoding and the error corrected speech signal is supplied to low bit rate codec 30a which includes a digital to analog converter, the analog output of which is supplied to loudspeaker 34.

Speech from the microphone 36 is supplied to the low bit rate codec 30a which includes an analog to digital converter, and the resulting low bit rate speech signal is encoded by the channel codec 30b to include error protection. The error protected bit stream is then encrypted, when in enciphering mode, by the control circuit 37 and the encrypted bit stream is supplied to the RF modem 32 for transmission from the aerial 31.

Figure 9:
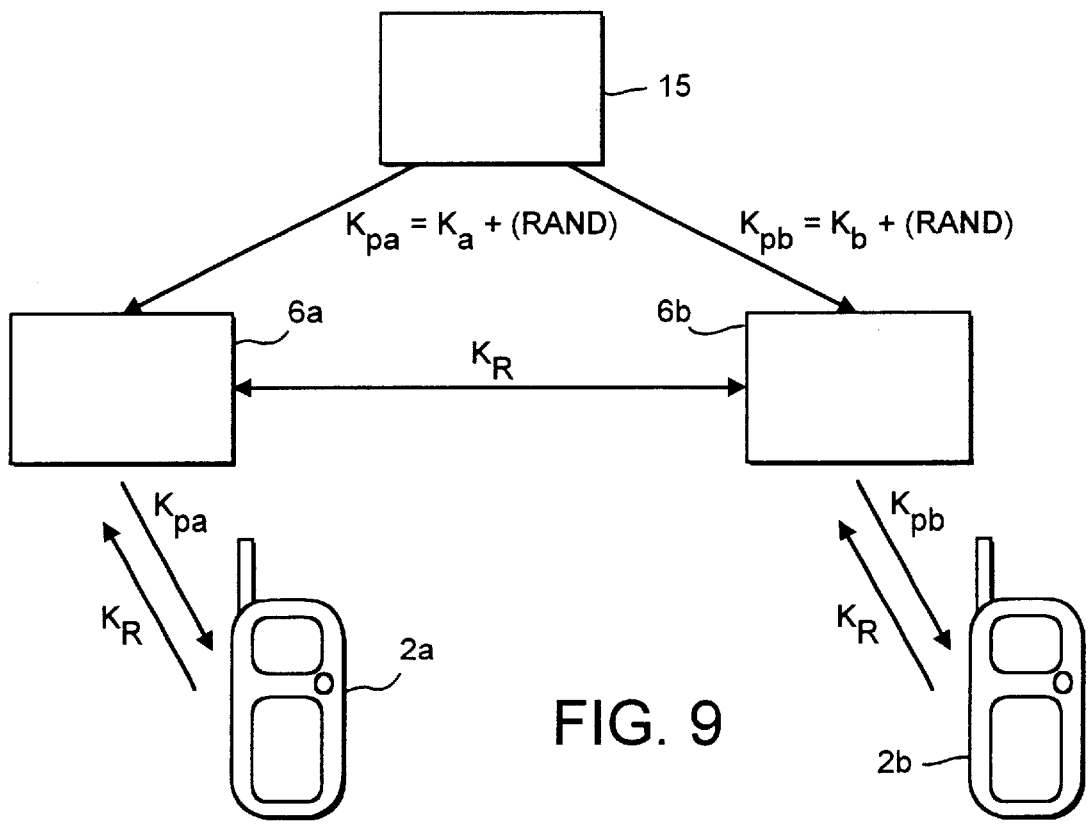
FIG. 9 is a schematic block diagram showing the flow of encryption data and signals between the components of FIG. 1 in the first embodiment.

Referring to FIGS. 9, 10 and 11, the process of setting up the enciphered mode of communication will now be described in greater detail.

During a communication session between two user terminals 2a, 2b, a user of one or both terminals elects to continue the conversation in encrypted form. Accordingly, referring to FIG. 10, in step 1002 the invoking party enters a sequence of key strokes from the keyboard 38, or operates on a special key which is recognised by the processor 37 as an instruction to invoke security, and accordingly the processor 37 transmits, in step 1002, a signal to invoke enciphering on an inband or associated control channel.

Referring to FIG. 11, at the earth station 6, in step 1102 the privacy request signal is received and in step 1104 the signal is sent to the central database station 15 together with the identity codes indicating the identities of the terminals 2a and 2b, and to the second user terminal 2b.

At the second user terminal 2b, receipt of the privacy signal occurs in step 1002 of FIG. 10.

Figures 12, 13:
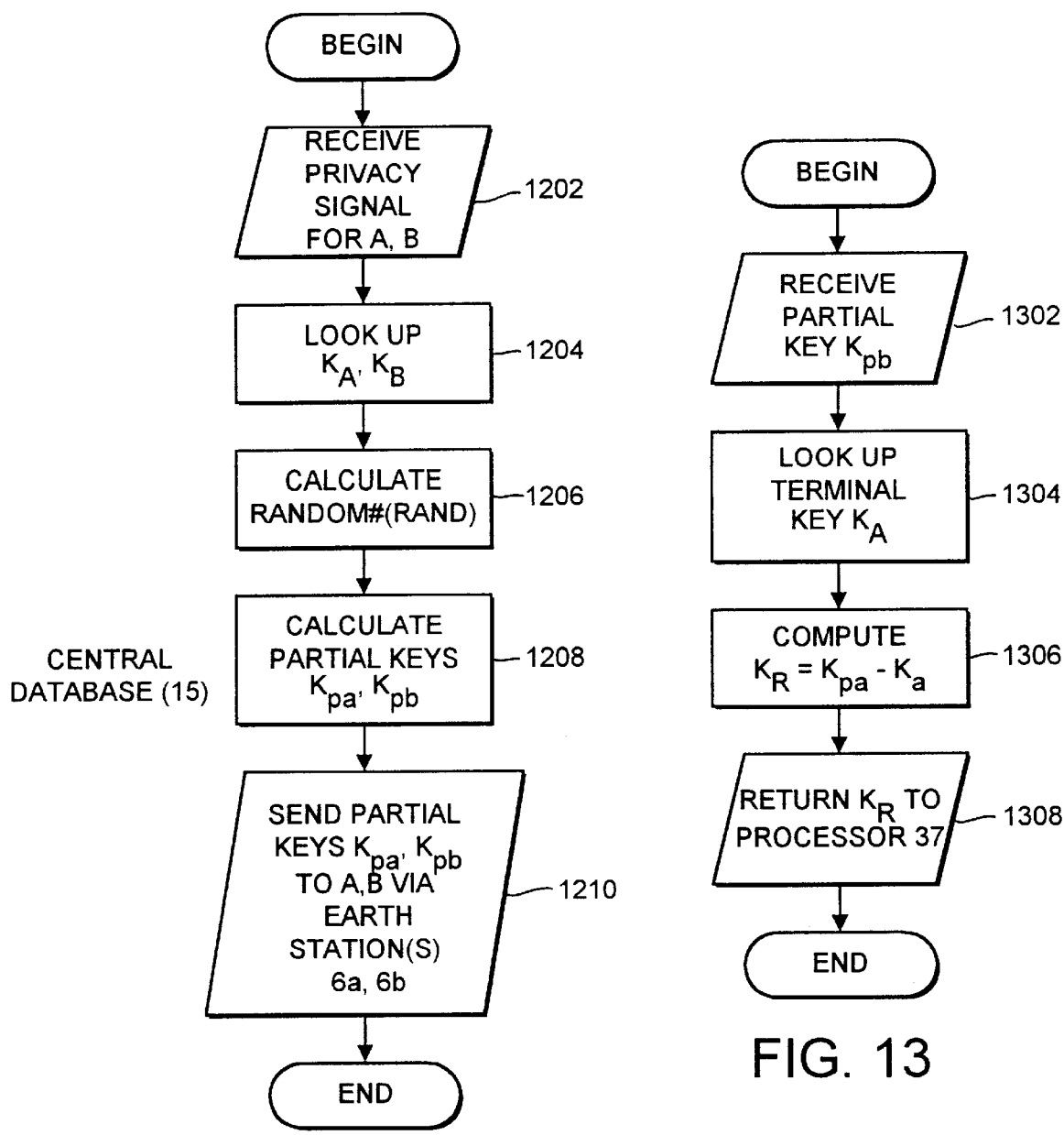
FIG. 12 is a flow diagram showing schematically the process of operation of the central database station of FIG. 4 in the first embodiment.
FIG. 13 is a flow diagram showing schematically the process of operation of a subscriber information module (SIM) held within the handset of FIG. 8 in the first embodiment.

Referring to FIG. 12, at the central database station the privacy signal is received in step 1202.

In step 1204, the controller 58 of the database station is accesses the memory 54 and reads out the individual enciphering key $K_a$ stored for the first mobile terminal 2a, and the key $K_b$ stored for the second mobile terminal 2b.

In step 1206, the controller 58 generates a pseudo random number (RAND).

In this embodiment, the keys $K_a$ and $K_b$ are each 128 bit binary numbers and the random number RAND is another 128 bit binary number.

Figure 15:
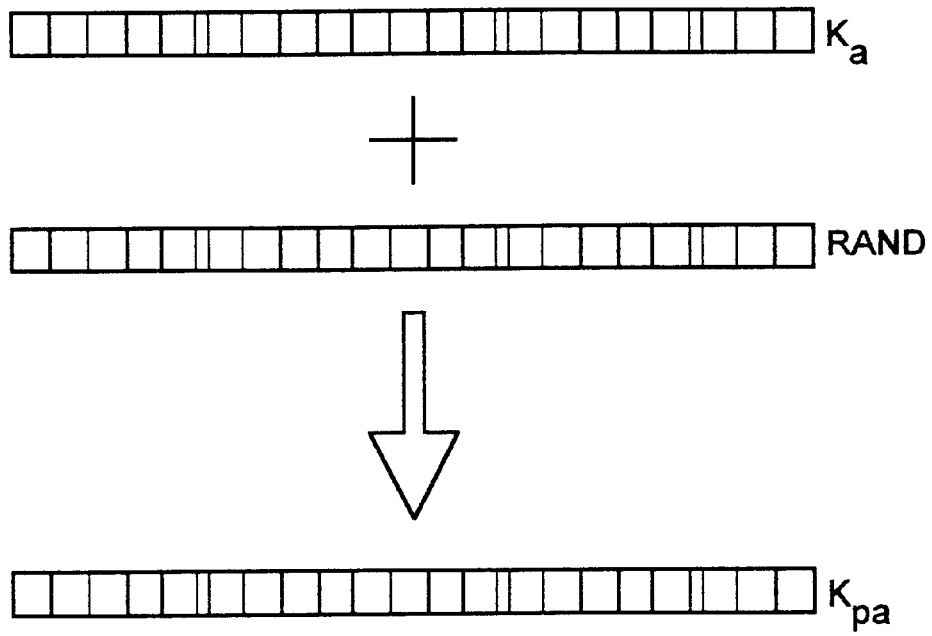
FIG. 15 is a an illustrative diagram showing the stages of formation of the enciphering key by a first handset terminal of FIG. 8.
Figure 16:
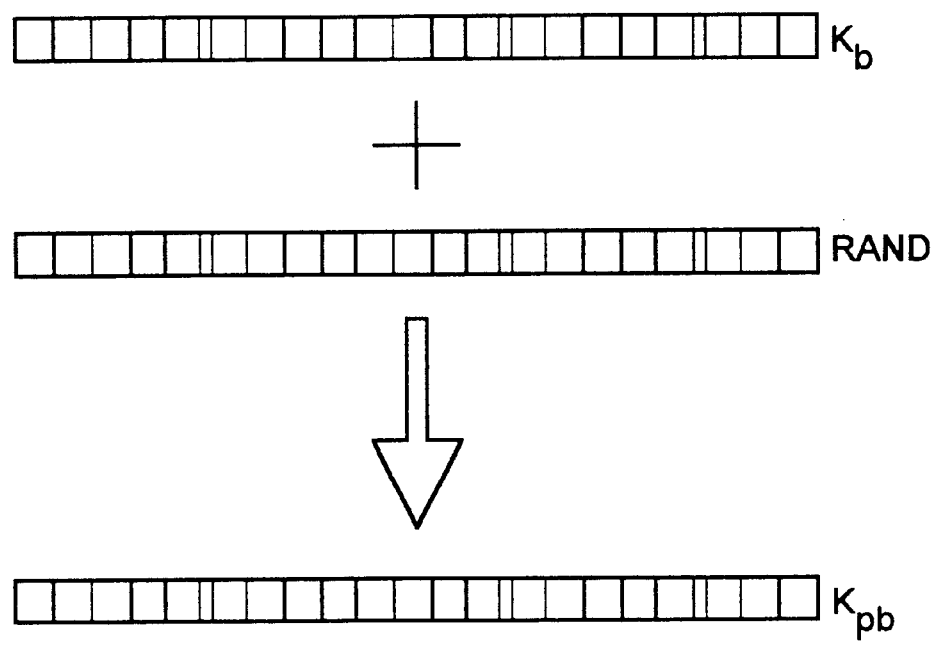
FIG. 16 is a corresponding illustrative diagram showing the process of formation of the enciphering key at a second such handset.

In step 1208, the controller 58 calculates first and second partial keys $K_{pa}$, $K_{pd}$. The calculation of the first partial key is illustrated in FIG. 15; this calculation comprises generating a 128 bit number each bit of which comprises the exclusive OR function of the bits in corresponding positions of the second terminal key $K_a$ and the random number RAND. Thus, the second partial key is given as follows $$K_{pa}=K_a+RAND$$

(where + indicates a binary addition operation).

The second partial key $K_{pb}$ is calculated in exactly the same way, by performing a bit-wise exclusive-OR operation between the first terminal key $K_b$ and the random number RAND, as shown in FIG. 15.

In step 1210 of FIG. 12, the central database station 15 transmits the first partial key ($K_{pa}$), to the first terminal 2a and the second partial key ($K_{pb}$) to the first terminal 2b, via the signalling network 60, and the respective earth stations 6b and 6a and satellites 4b and 4a.

At this stage, each individual terminal key has been "scrambled" by the binary addition operation with the random number RAND. An unauthorised eavesdropper who monitors one of the partial keys cannot learn the terminal key from it because there are two unknowns; the random number RAND and the terminal key. Even an unauthorised eavesdropper who monitors both partial keys cannot derive either the random number or one of the terminal keys, because he has only two data from which to derive three unknowns; the best that can be derived is the difference between the two terminal keys, which is of no value.

Referring now to FIG. 11, in step 1106 each earth station receives the partial key and forwards it to the mobile terminal in step 1108.

Referring to FIG. 10, in step 1004, each of the mobile terminals (2a, 2b) receives a corresponding partial key ($K_{pa}$, $K_{pb}$). In step 1006, the partial key is transmitted via the card reader 33 to the SIM 35.

Referring to FIG. 13, in step 1302, the SIM receives the partial key and in step 1304 the SIM reads the terminal key from within the memory 35b. In step 1306, the SIM processor 35a recovers the binary number RAND by comparing the stored terminal key $K_a$ from the partial key $K_{pa}$, to generate a new 128 bit binary number. The comparing step is carried out by exclusive-ORing $K_{pa}$ and $K_a$. Thus, the SIM processor computes a code $K_R$ where $$K_R = K_{pa}$$
$$= K_a + (RAND) - K_a$$
$$= (RAND)$$

In step 1308, the SIM 35 supplies $K_R$=(RAND) the card reader device 33 to the terminal processor 37. The code $K_R$ is used as an enciphering key for data to be transmitted.

Likewise, at the second terminal 2b, the value of $K_R$= (RAND) is computed by subtracting the stored value Kb in the SIM of the terminal from the second partial key $K_{pb}$, i.e.

$$K_R = K_{pb} - K_b$$
$$= Kb + (RAND) - K_b$$
$$= (RAND)$$

Thus, each terminal 2a, 2b, calculates the same enciphering key $K_R$=(RAND).

Referring back to FIG. 10, in step 1008, the terminal processor 37 receives the encryption key $K_R$ and in step 1010 the terminal 37 switches to encryption mode. Thereafter, at step 1012, the processor 37 functions to encrypt the bit stream from the codec 30 prior to RF modulation and transmission, and to decrypt the corresponding bit stream from the RF modem 32 prior to supply thereof to the codec 30 using the key $K_R$.

The encryption algorithm may be any suitable algorithm and may be openly known, since the encryption key $K_R$ itself is secret. The encryption algorithm is conveniently the A5 encryption algorithm used in GSM handsets and described in the above referenced GSM Recommendations.

Thus, to recap, as shown in FIG. 9, in this embodiment each terminal 2 has an associated unique terminal key which is stored in the SIM 35 held within the terminal and in the central database station 15. The enciphering key $K_R$ used is a function of the random number (RAND) generated in the remote database station 15 which distributes it to 2a, 2b in a masked form, in the partial keys $K_{pa}$, $K_{pb}$.

Transmitting the terminal keys in masked form prevents an eavesdropper from gaining access to either terminal key. By changing the masking on each session operation namely by generating a continually changing sequence of pseudo-random numbers (RAND), an eavesdropper cannot learn the masking function over time.

Nor is it possible for either terminal or SIM to work out the other's terminal key, since this is masked even from the terminals themselves.

Second Embodiment

Figure 14:
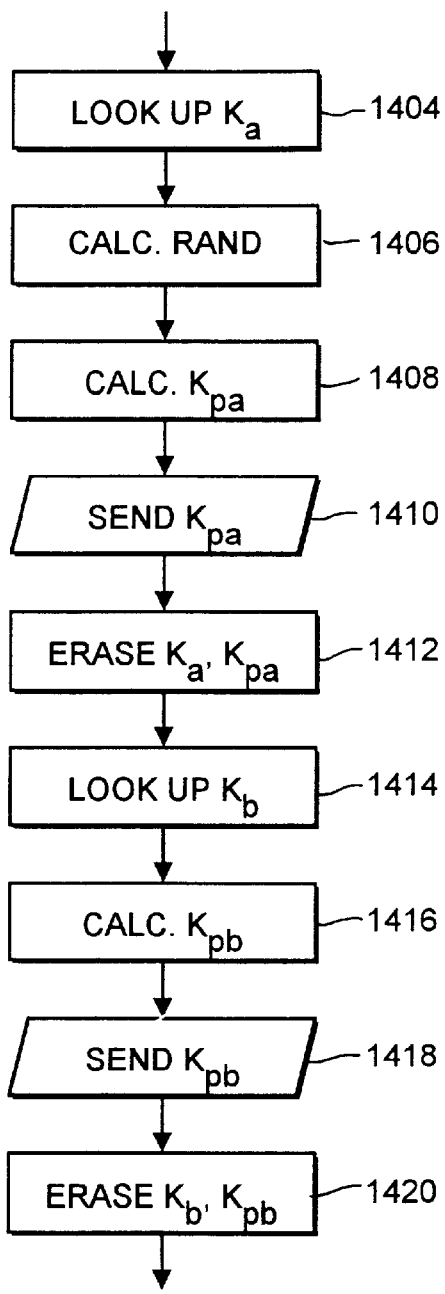
FIG. 14 is a flow diagram illustrating schematically the stages of security provided in a fourth embodiment of the invention.

In a second embodiment, security is further improved by reducing the opportunities for unauthorised tampering at the central database station. The second embodiment works substantially as the first except that, as shown in FIG. 14, instead of steps 1204 to 1210 of FIG. 12 being performed, steps 1404 to 1420 are performed.

Accordingly, after step 1202, the processor 58 first accesses the first terminal key $K_a$ in step 1404, then calculates the random number in step 1406 (as described in relation to step 1206), then calculates the first partial key $K_{pa}$ in step 1408 (as described in relation to step 1208), and then sends the first partial key in step 1410 (as described in relation to step 1210).

After these operations, any locally stored copies of $K_a$ and $K_{pa}$ are erased. Then, in step 1414, the processor 58 accesses the second terminal key Kb, calculates the second partial key $K_{pb}$ (step 1416), sends the second partial key (step 1418), and erases the second partial key and second terminal key (step 1420).

Thus, in this embodiment, access to the two partial keys and terminal keys is separated in time, reducing the possibilities for eavesdropping or fraudulent use of the database station 15.

It will be apparent that access to the two partial keys and/or terminal keys could be separated in other ways; for example, by sending the two terminal keys to physically separate devices and then sending the random number to each of the devices for combination there with the terminal keys.

Rather than sending the same random number to two different devices, for additional security, two identical, in-step, random number generators may be provided at two different locations, to which the two terminal keys are sent. Thus, access to the two terminal keys and/or partial keys may be separated physically as well as, or instead of, in time.

Third Embodiment

In this embodiment, security is further increased by enciphering each of the partial keys $K_{pa}$, for transmission. Although it would be possible to use a common cipher, this would be undesirable since eavesdroppers with access to the common cipher (e.g. other authorised users of the privacy service) might be able decipher the cipher.

Equally, it is preferred not to use an air interface cipher of the type known is in the GSM system because this would be open to interception in the fixed part of the network.

Accordingly, in this embodiment, the SIM 35 stores a decryption algorithm (which may conveniently be the A5 algorithm used in GSM systems) and the database station 15 is arranged to execute the corresponding encryption algorithm.

Figure 17A:
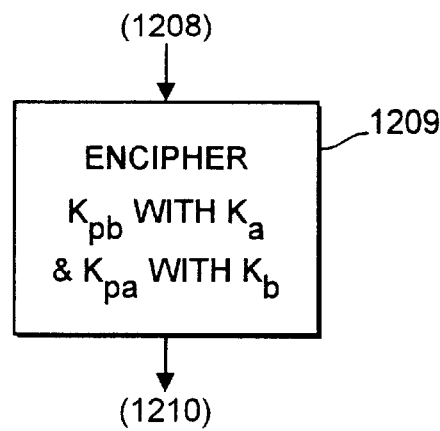
FIGS. 17a and b is a flow diagram modifying the operation of that of FIGS. 12 and 13 in the third embodiment of the invention.

Referring to FIG. 17a, in this embodiment the process of FIG. 12 of the first embodiment is modified by the inclusion of a step 1209, between steps 1208 and 1210, in which each partial key is enciphered using the terminal key of the terminal to which it will be sent and is transmitted in enciphered form.

Figure 17B:
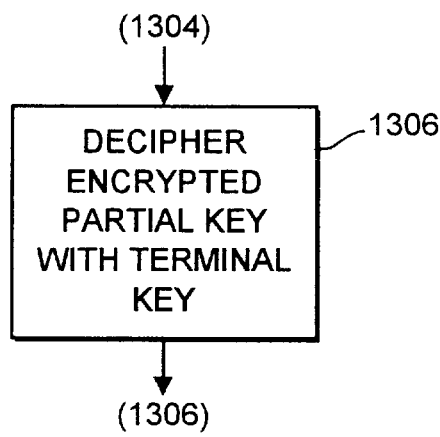

At each terminal, referring to FIG. 17b, in this embodiment the SIM processor 35a performs an additional step 1305 between steps 1304 and 1306. In step 1305, the received partial key is decrypted using the terminal key, prior to calculating the ciphering key.

Thus, in this embodiment, additional security is provided by encrypting the transmitted partial keys and conveniently, the encryption makes use of the terminal key of the destination terminal, so to avoid the need to store further encryption data.

Obviously, however, other forms of encryption are possible; in particular, more sophisticated encryption algorithms in which an additional random number is also sent would be possible.

Fourth Embodiment

In this embodiment, the principle of the first embodiment is utilised, in combination with the air interface encipherment and authentication system presence in GSM compatible networks and specified in the above GSM recommendations.

Figure 18:
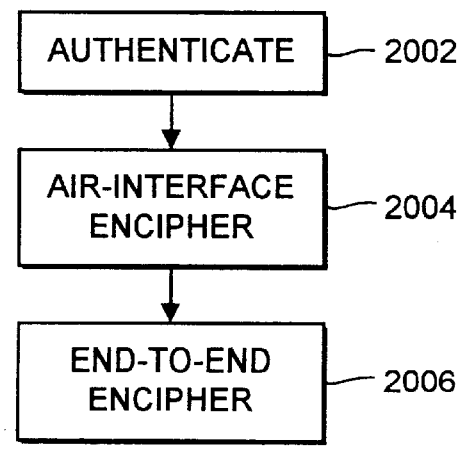
FIG. 18 is a flow diagram of an authentication process.

Referring to FIG. 18, the security features are applied in the following order:

Authentication (step 2002); Air-Interface encryption (step 2004); End-to-End encryption (step 2006).

The first two steps are as in existing GSM networks and the third is as described above as in relation to the first embodiment. The process will now be described in more detail.

Figure 19A:
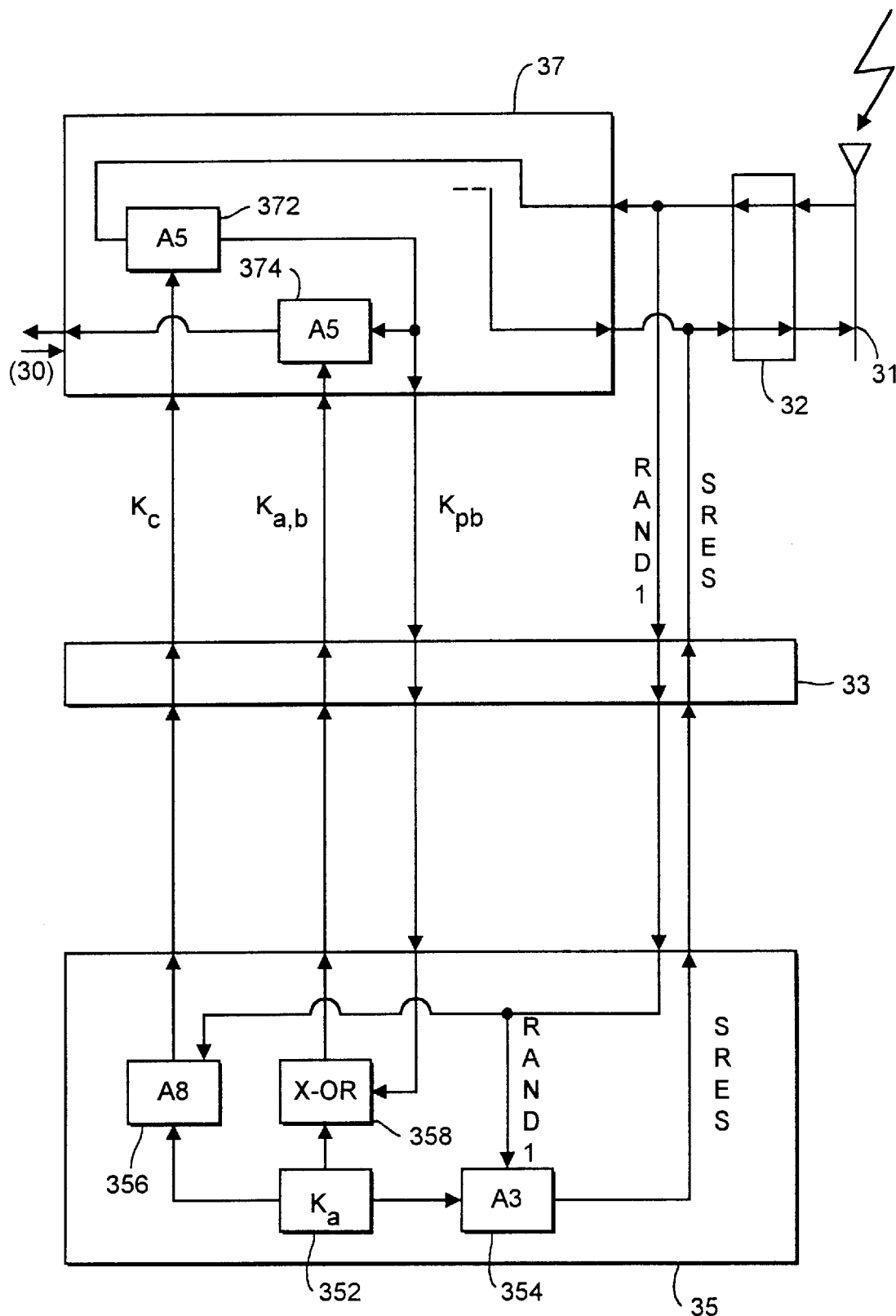
FIG. 19a is a block diagram showing schematically some of the functional elements present in the handset of FIG. 8 according to the fourth embodiment of the invention.

Referring to FIG. 19a, the functions performed by the handset processor 37 and SIM 35 will be described as separate functional blocks; each functional block could, of course, be implemented by a separate microprocessor or digital signal processor (DSP) device but in this embodiment, in fact, only one such processor device is present in the handset and one in the SAN 35.

Referring to FIG. 19a, signals received from the antenna 31 and demodulated by the RF modem 32 are passed through a first enciphering/deciphering stage 372 arranged to apply the AS algorithm known from GSM in accordance with an air interface enciphering key $K_c$, and a second enciphering/deciphering stage 374 arranged to apply a second deciphering algorithm (conveniently, again, the A5 algorithm used in the GSM system and described in the above Recommendations) deciphering in accordance with an end-to-end enciphering key $K_{a,b}$. The deciphered bit stream is thereafter supplied to the codec 30.

Similarly, the speech bit stream from the codec 30 passes through the two enciphering/deciphering stages 372,374 in the reverse order; for clarity, the signal path has been omitted from FIG. 19a.

Within the SIM 35 is located a terminal key storage register 352 storing the terminal key $K_a$ for the terminal, in this case $K_a$ for the terminal 2a. The terminal key storage register 352 is connected to supply the terminal key $K_a$ to a signature calculation stage 354, arranged to calculate a "signed response" number (SRES) used to authenticate the terminal, in accordance with the A3 algorithm described in the above mentioned GSM Recommendations and used in GSM systems. The response calculation stage 354 is also connected, via the card reader device 33, to receive a random number (RAND1) from the unenciphered bit stream output from the RF modem 32.

The terminal key register 352 is also connected to supply the terminal key $K_a$ to a first key generation stage 356, which is also arranged to receive the random number (RAND1) and to calculate therefrom an air interface enciphering key Kc in accordance with the A8 algorithm described in the above GSM Recommendations and used in GSM systems. The key thus calculated is supplied, via the card reader device 33, to the first (air interface) enciphering/deciphering stage 372 of the terminal processor 37.

The terminal key register 352 is also connected to supply the terminal key to a second key generation stage 358, which is arranged to generate an enciphering key $K_R$ for end-to-end encryption (by an exclusive OR function as described in the first embodiment) utilising the terminal key $K_a$ and the partial key $K_{pa}$ which it is connected to receive (via the card reader device 33) from the deciphered output of the first (air interface) enciphering/deciphering stage 372 of the terminal processor 37.

The end-to-end enciphering key thus calculated is supplied to the second (end-to-end) enciphering/deciphering stage 374 of the terminal processor 37.

Figure 19B:
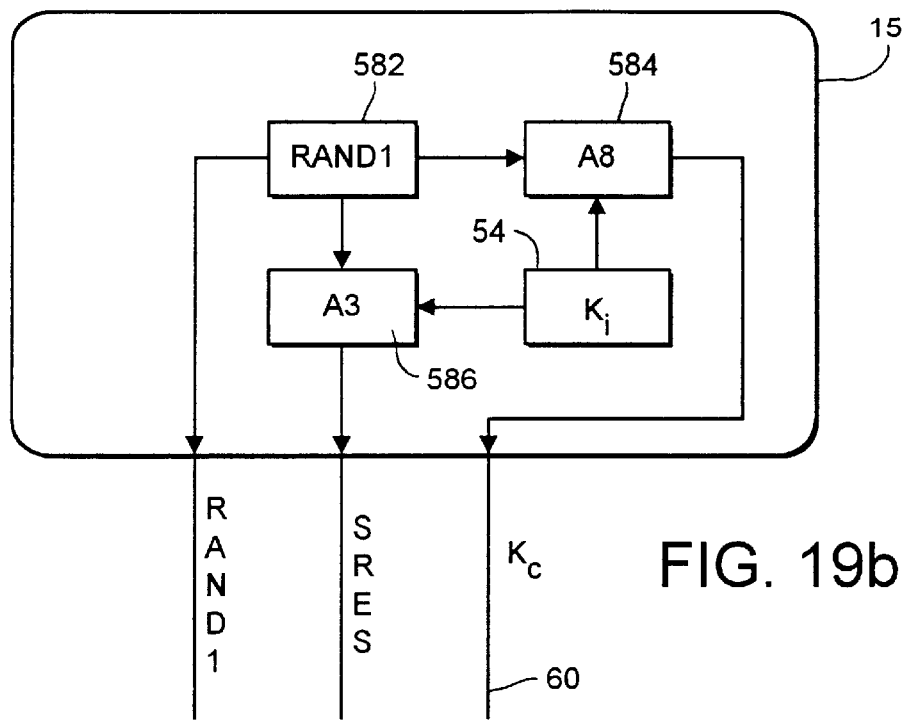
FIG. 19b is a block diagram showing schematically some of the functional elements present in the database station of the fourth embodiment.

Referring to FIG. 19b, the central database station 15 comprises, in this embodiment, a random number generator 582 arranged to generate, on each occasion of use, a new binary 128 bit number (RAND1) in a random sequencer a store 54 storing the terminal keys $K_i$; a key generation stage 584 which is connected to receive a terminal key from the store 54, and the random number (RAND1), and to calculate therefrom an air interface enciphering key $K_c$ in accordance with the A8 algorithm described in the GSM recommendations and used in GSM systems; and a signature calculation stage 586, which likewise is connected to receive the terminal key and the random number (RAND1), arranged to calculate the signed response number (SRES) in accordance with the A3 algorithm described in the above mentioned GSM Recommendation and used in GSM systems.

The outputs of the random number generator stage 582, signed response generator stage 586 and key generation stage 584 are connected to the signalling circuit 56 for transmission to the earth stations 6.

Figure 19C:
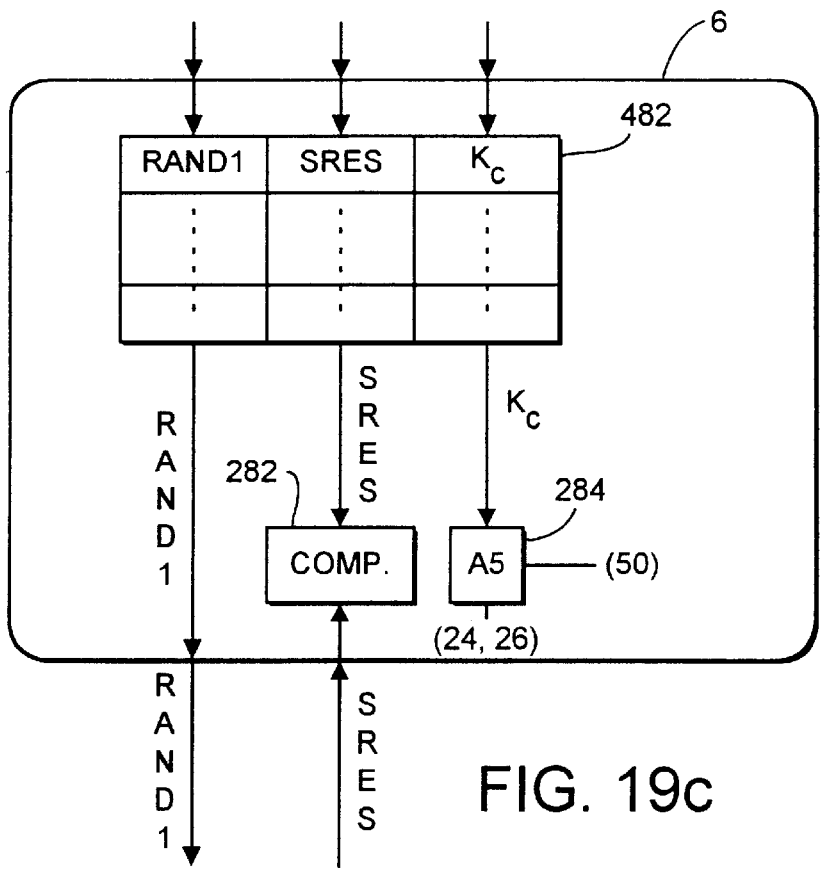
FIG. 19c is a block diagram showing schematically some of the functional elements present in the earth station of the fourth embodiment.

Referring to FIG. 19c, each earth station 6 comprises (within the database 48) a triplet register 482 arranged to store a predetermined number (e,g. 5) of triplets each comprising a random number, a corresponding SRES and a corresponding air interface encryption key $K_c$, supplied via the signalling circuit 60 from the database station 15.

On each occasion when a mobile terminal 2 registers with the earth station 6, the earth station requests the supply of the predetermined number of triplets from the central database station 15, which accordingly generates the predetermined number of triplets and transmits them for storage in the registers 482 via signalling channel 60.

Also provided within the earth station 6 is a comparator 282 coupled to the triplet register 482 and to the air interface components 24, 26 of the earth station 6, and arranged to compare a signed response (SRES) number received from a mobile terminal 2 with a signed response stored in the register 482, and to indicate correspondence (or absence thereof) between the two numbers. If the two numbers do not correspond, the user is not authenticated and service is discontinued by the control unit 28.

Finally, the earth station 6 comprises an air interface encryption stage 284 arranged to encipher and decipher in accordance with the AS algorithm known from GSM) making use of an air interface enciphering key $K_c$ supplied from the triplet register 482.

In the enciphering direction, the air interface enciphering/deciphering stage 284 receives an input from the codec 50 (FIG. 3) and delivers its output to the air interface components 24,26; whereas in the deciphering direction the enciphering/deciphering stage 284 receives its input from the air interface components 24, 26 and delivers its output to the codec 50.

The operation of this embodiment will now be described in greater detail with reference to FIGS. 20 to 23. In FIGS. 20 to 23, steps of the processes of FIGS. 10 to 13, which will not be discussed further in detail, are incorporated.

As in FIG. 10, a request for privacy is initiated by one of the parties and a privacy request signal is transmitted from the terminal 2a.

Following receipt (step 1102) of the privacy signal at the earth station 6a and forwarding thereof (step 1104) to the database station 15, referring to FIG. 12, steps 1202 and 1204 are performed to derive the terminal keys of the two terminals.

Then, in step 1205, a test is performed to determine whether both subscribers are authorised to use end-to-end encryption. If so, steps 1206 to 1210 of FIG. 12 are performed. Subsequently, or if not, the database station 15 proceeds to step 1212, in which it transmits a signal to the earth station(s) 6a,6b serving the two terminals 2a,2b to instruct them to perform a terminal authentication check and to commence air interface encryption.

Referring back to FIG. 21, each earth station 6, on receipt of the instruction signal and partial key (step 1110), sends an authentication interrogation message (step 1112) which includes the next random number RAND1 obtained from the triplet register 482. Additionally, as in the GSM system, a key number may be transmitted for further verification.

Referring back to FIG. 20, on receipt of the authentication request message (step 1014) the random number (RAND1) is extracted and sent to the SIM 35 (step 1016).

Referring to FIG. 13, at the SIM 35, on receipt of the random number RAND1 (step 1310), the SIM processor 35a looks up the terminal key $K_a$, (step 1312) and calculates the signed response (SRES) using the A3 algorithm (step 1314).

In step 1316, the SIM processor 35a calculates the air interface enciphering key $K_c$ using the random number (RAND1) and the terminal key $K_a$. In step 1318, the SIM 35 transmits the signed response number (SRES) and the air interface enciphering key ($K_c$) to the terminal processor 37 via the card reader device 33.

Subsequently, the SIM 35 executes the process of FIG. 13.

Referring to FIG. 20, on receipt of the signed response number (SRES) in step 1018, the terminal processor 37 transmits the SRES number to the earth station 6a (step 1020).

Figure 21:
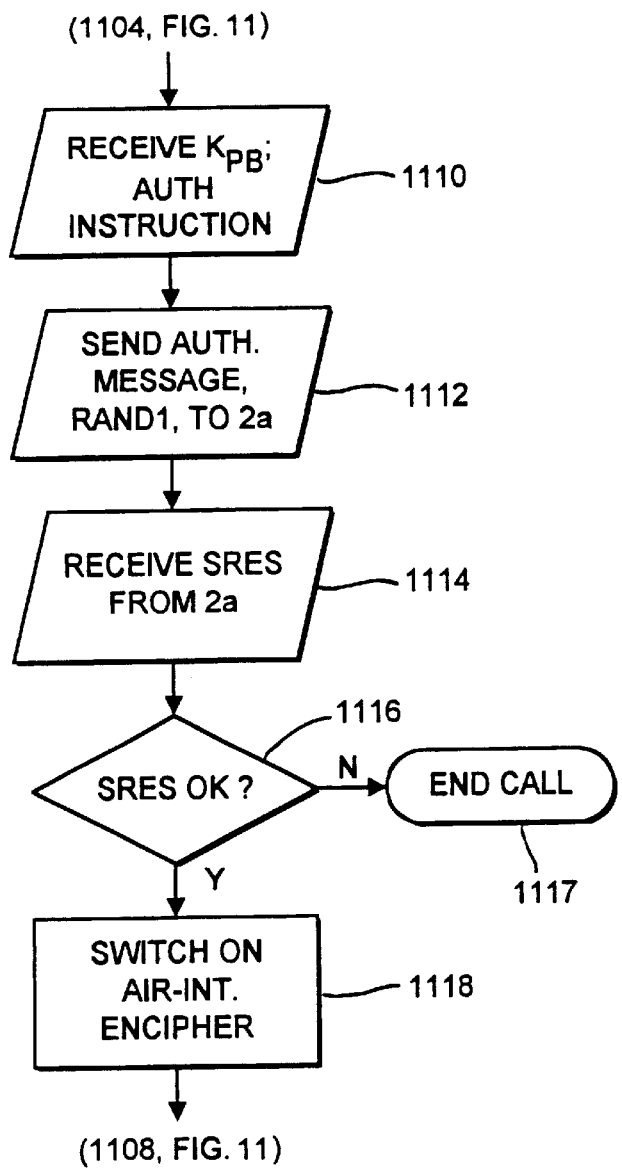
FIG. 21 (incorporating parts of FIG. 11) is a flow diagram showing schematically the process of operation of an earth station according to the fourth embodiment.
Figure 22:
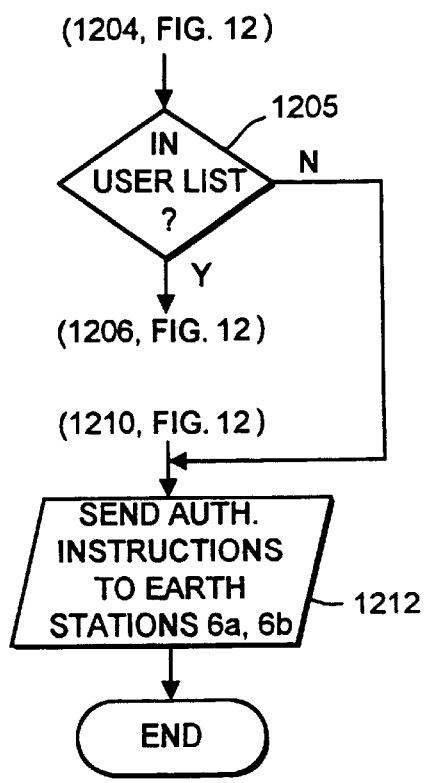
FIG. 22 (incorporating parts of FIG. 12) is a flow diagram showing schematically the operation of a database station according to the fourth embodiment.

Referring to FIG. 21, the earth station 6 receives the signed response number (1114) and compares it with the stored signed response number held in the triplet register 482 (step 1116).

If the two do not match, the call is terminated (step 1117). Alternatively, further attempts at authentication may be made if desired.

If the signed response received from the mobile terminal 2 matches the stored signed response in step 1116, the earth station 6 reads the enciphering key $K_c$ stored in the triplet register 482 corresponding to the signed response just received, and (step 1118) commences enciphering all future traffic to, and deciphering all future traffic from, the mobile terminal 2 using the A5 algorithm together with the enciphering key $K_c$. As is conventional in GSM systems, the frame number may also be used as an input to the enciphering algorithm.

The earth station 6 thereafter returns to step 1108 of FIG. 11, to send the partial key $K_{pa}$ received from the database station 15 to the terminal 2a, but in this embodiment this takes place in enciphered form.

Returning to FIG. 20, on receipt of the air interface encryption key $K_c$ (step 1022) from the SIM 35, the terminal processor 37 starts the enciphering/deciphering mode in which all traffic received from the air interface modem 32 is deciphered and all traffic transmitted to the air interface modem 32 is enciphered using the A5 algorithm and the air interface enciphering key Kc; where the earth station 6 additionally makes use of the frame number, the terminal 2 likewise does so.

The process performed by the terminal processor 37 of terminal 2a (in this example) then returns to step 1004 of FIG. 10, to receive (in encrypted form), decrypt and use the partial enciphering key $K_{pa}$ received from the earth station 6. A corresponding process is performed for the terminal 2b.

Although the above description assumes that neither terminal has recently been authenticated, and that neither terminal is already in air interface encryption mode, it will be understood that this need not be the case. If either terminal is already applying air interface encryption, then the corresponding steps described above to set up authentication and air interface enciphering are not performed again.

In the above embodiment, additional safeguards may be provided; for example, to initiate secure communications, the terminal user may be required to input a PIN code for matching with data held on the SIM.

It will be understood that, where the invention is practised in a GSM-compatible system or the like, the SIM 35 will contain further information in the form of the international mobile subscriber identity number (IMSI), and optionally lists of phone numbers for speed dial or other purposes.

Conference Calls

Figure 24:
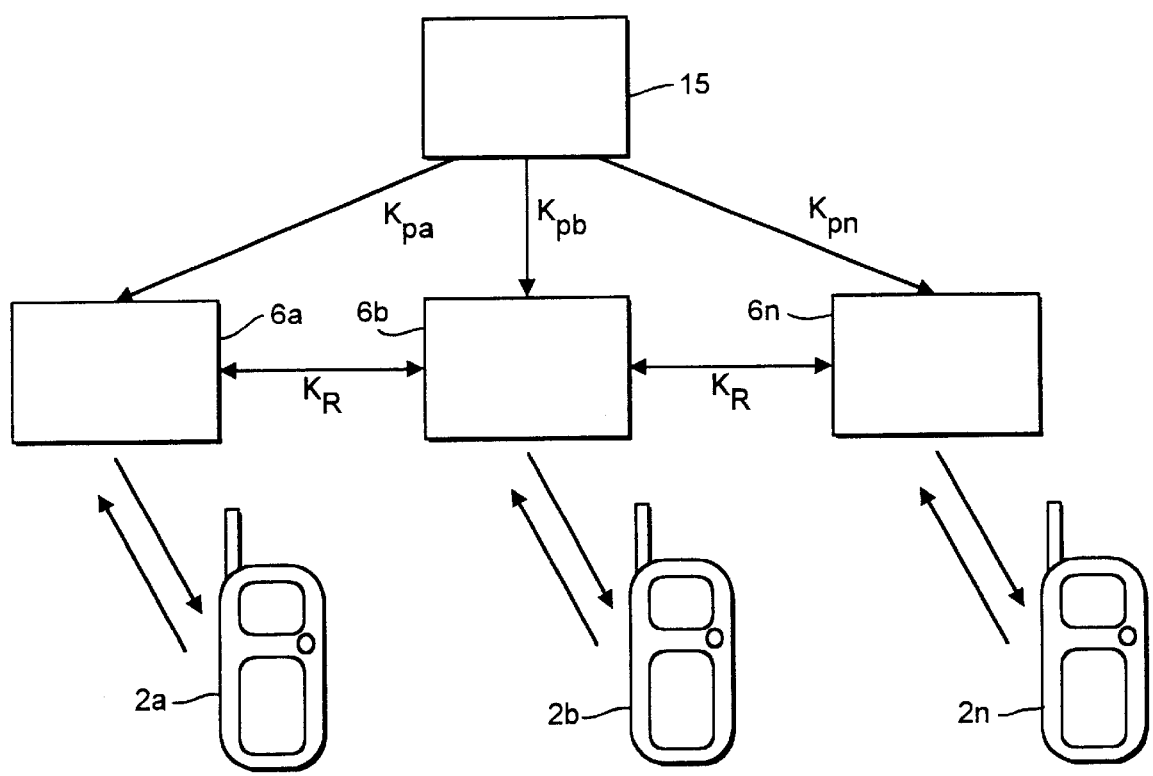
FIG. 24 illustrates how embodiments of the invention can be used for conference calls with more than two user terminals.

The encryption scheme according to the invention has the significant advantage that the common encryption/decryption code $K_R$ that is formed in each of the terminals 2a, 2b consists of the random number (RAND) supplied from the data base station 15. Thus, in the method according to the invention, the length of the encryption/decryption code $K_R$ is independent of the number of terminals used during the call. This has implications for conference calls as will now be explained with reference to FIG. 24. This Figure corresponds generally to FIG. 9 but illustrates more than two user terminals, for use in a conference call. In FIG. 24, three terminals are shown, namely terminal 2a, 2b and 2n which each form a respective communication link with a earth station 6a, 6b, and 6n.

In order to set up the conference call, partial keys $K_{pa}$, $K_{pb}$ and $K_{pn}$ are transmitted from the central database station 15 to each of the earth stations 6a, 6b and 6n and the keys are then transmitted to the respective user terminals 2a, 2b, 2n. The partial keys are then decoded at the user terminals respectively in the manner previously described such that each terminal develops the common encryption code $K_R$= (RAND). The terminals can then use the common code $K_R$ to encrypt and decrypt data for the conference call between the three user terminals. It will be appreciated that although three terminals are shown, much larger numbers could be used for the conference call. This contrasts with the method described in our prior GB 9611411.1 in which each terminal needs to be provided with data based on the terminal key codes for all the other terminals used for the call and so when many terminals are used in a conference call, the encryption code becomes extremely long and cumbersome.

One or more additional terminals may join in a call whilst it is in progress, either to expand a normal two party call into a three party conference call or to increase the number of parties in a conference call. To this end, the joining party is sent a masked version of the code RAND from the base station 15 together with the frame number for the data transmission that is going on between the parties, so that the joining party can use the locally held A5 algorithm to compute the current value of the encryption key and join in the transmitted data flow.

The ability to set up secure conference calls between many user terminals has particular application for secure closed user group (CUG). To this end, the database station 15 may include a list of members of a closed user group which are permitted to correspond with other members in a conference call or individually. For example, a closed user group may comprise armed services personnel or emergency services personnel. In a modification, more than one database station 15 is provided and a supervising database station (not shown) may be used to in order to coordinate more than one CUG to allow them to share facilities, for example on a temporary basis so that for a particular project e.g. a combined service operation, the CUGs may communication with each other over conference calls or individually in a secure, encrypted manner. In another modification, a single database station 15 is used and, for the temporary period of cooperation, all user terminals are provided with reprogrammed SIM cards to allow secure communication within the temporary group.

Other Embodiments

Many modifications and alternatives to the previously described embodiments will be apparent to the skilled person and are within the scope of the present invention.

For example, in practice, duplex transmission occurs between, the user terminals on different channels. For additional security different individual codes $K_R$, may be used for each of the duplex channels, produced by means of separate partial keys transmitted from the database station 15, using different values of the pseudo random number (RAND) for each channel.

The numbers of satellites and satellite orbits indicated are purely exemplary. Smaller numbers of geostationary satellites, or satellites in higher altitude orbits, could be used; or larger numbers of low earth orbit (LEO) satellites could be used. Equally, different numbers of satellites in intermediate orbits could be used.

Although TDMA has been mentioned as suitable access protocol, other access protocols can be used such as code division multiple access (CDMA) or frequency division multiple access (FDMA).

Whilst the principles of the present invention are envisaged above as being applied to satellite communication systems, the use of the invention in other communications systems e.g. digital terrestrial cellular systems such as, but not limited to GSM, is also possible.

Although, for the sake of convenience, the term "mobile" has been used in the foregoing description to denote the terminals 2, it should be understood that this term is not restricted to hand-held or handportable terminals, but includes, for example, terminals to be mounted on marine vessels or aircraft, or in terrestrial vehicles. Equally, it is possible to practice the invention with some of the terminals 2 being completely immobile.

Instead of providing a single central database station 15 storing details of all terminal equipment 2, similar details could be stored at the home gateway 8 for all terminal equipment to register with that home gateway 8.

Whilst in the above described embodiments the central database station 15 acts as a Home Location Register (HLR) of a GSM system, and may be provided using commercially available HLR hardware, and the databases within each earth station 6 act in the manner of visiting location registers (VLRs) and may likewise use commercially available GSM hardware, it will be understood that the information relating to different users could be distributed between several different databases. There could, for instance, be one database for each closed user group, at physically different positions.

Whilst in the fourth embodiment above the same terminal key $K_i$ is used for secure end-to-end encryption as is used for air interface encryption, it will be clear that this is not necessary; each terminal could store two different terminal keys, one for air interface encryption and one for end-to-end encryption. In this case, a separate authentication centre database could be provided for end-to-end encryption key distribution to that which is used in conventional air interface encryption.

Although in the foregoing embodiments, the same (AS) cipher algorithm used for the air interface encryption of the GSM system is used in end-to-end encryption, it will be apparent that a different cipher could be used; in this case, terminals would include two different enciphering stages for use in the fourth embodiment. Further, where multiple closed user groups are provided, each closed user group could use a different cipher.

In the foregoing, the gateways 8 may in fact be comprised within an ISC or exchange or mobile switching centre (MSC) by providing additional operating control programmes performing the function of the gateway.

In the foregoing, dedicated ground networks lines have been described, and are preferred. However, use of PSTN or PLMN links is not excluded where, for example, leased lines are unavailable or where temporary additional capacity is required to cope with traffic conditions.

It will understood that the stores within the gateways 8 need not be physically co-located with other components thereof, provided they are connected via a signalling link.

Whilst, in the foregoing, the term "global" is used, and it is preferred that the satellite system should cover all or a substantial part of the globe, the invention extends also to similar systems with more restricted coverage (for example of one or more continents).

Whilst the foregoing embodiments describe duplex communications systems, it will be clear that the invention is equally applicable to simplex (one way) transmission systems such as point-to-multipoint or broadcast systems.

Whilst the preceding, described embodiments are direct transmission systems, it will understood that the invention is applicable to store-and-forward communications systems in which one party transmits a message for storage and subsequent later transmission to the other party.

One example of such a store-and-forward system is e-mail, for example of the type provided by Compuserve™ or MCI™. Another example is the Internet, which, as is well known, consists of a number of host computer sites interconnected by a backbone of high speed packet transmission links, and accessible for file transfer from most points in the world via public telecommunications or other networks.

In an embodiment of this type, a central database station 15 need not distribute keys to both terminals at the same time; instead, distribution of the partial key to the transmitting terminal may take place at the time of transmission of a file of data for storage in encrypted form, and distribution of a partial key to the receiving terminal may take place substantially later, for example, at the next occasion when the receiving terminal is connected to the network and/or the next occasion when the receiving terminal wishes download the file from intermediate storage in a host computer.

It will be understood that whilst the previously described embodiments concern voice transmission, the invention is applicable to the encryption of data of any kind and particularly, but not exclusively, to image data, video data, text files or the like.

It will be understood that the geographical locations of the various components of the invention are not important, and that different parts of the system of the above embodiments may be provided in different national jurisdictions and the present invention extends to any part or component of telecommunications apparatus or system which contributes to the inventive concept.

What is claimed is:

1. A method of distributing though a communication network, enciphering key data to be used in encrypting and decrypting data at first and second terminals so as to provide secure data transmission between the terminals through the network, the terminals each storing corresponding first and second terminal keys, the method comprising:

storing the first and second keys remotely of the terminals;

generating at a location remote from both of the terminals, first and second separate partial keys each as a masked function of a common number and a corresponding one of said stored keys;

dispatching the first partial keV separately towards the first terminal; and separately dispatching the second partial key towards the second terminal, wherein the enciphering key data is to be used for encrypting and decrypting data at said first and second terminals and at least one further terminal so as to provide security for concurrent data transmissions between all of said terminals through the network, the method further including:

storing a further key remotely of the terminals corresponding to the terminal key of the further terminal;

generating a further partial key as a masked function of the common number and said remotely stored further key; and dispatching the further partial key towards the further terminal.

2. A method according to claim 1 including causing the further terminal to join in data transmission between the terminals whilst said transmission is in progress, including transmitting to the further terminal, timing data concerning the data transmission between the terminals.

3. A method according to claim 1 wherein one or more of the partial keys is transmitted to the terminals over an air interface of a mobile communications system.

4. A method according to claim 3 including additionally encrypting data transmitted over the air interface.

5. A method according to claim 4 including performing the additional encryption at each said terminal with the terminal key of the respective terminal and a predetermined algorithm.

6. A terminal for communicating through a communication network with at least one further terminal, comprising:

means to receive a store that stores an individual terminal key;

a key generator to receive from the network a partial key comprising a masked function of the individual terminal key and a number transmitted in common to said at least one further terminal, and operative to compare the individual key stored in the store with said partial key so as to produce an encryption code as a function of said number;

enciphering means operative to encipher data transmitted through the network in accordance with the encryption code; and user operable means for selectively initiating operation of the enciphering means, the terminal being operative to transmit and receive data in different channels through the network, wherein the enciphering means is operative to encipher data transmitted through the network in accordance with a first said encryption code, and including deciphering means operative to decipher data received through the network in accordance with a second, different said encryption code.

* * * * *